(12) United States Patent
Malecki et al.

(10) Patent No.: US 12,478,420 B2
(45) Date of Patent: Nov. 25, 2025

(54) EXHAUST REMOVAL FOR CRYOGENIC TREATMENT

(71) Applicant: Channel Medsystems, Inc., Berkeley, CA (US)

(72) Inventors: William Malecki, Oakland, CA (US); Vincent Lopresti, Niwot, CO (US); Ulric E. Coté, Oakland, CA (US); David Beaulieu, El Cerrito, CA (US)

(73) Assignee: Channel Medsystems, Inc., Berkeley, CA (US)

( * ) Notice: Subject to any disclaimer, the term of this patent is extended or adjusted under 35 U.S.C. 154(b) by 465 days.

(21) Appl. No.: 18/056,184

(22) Filed: Nov. 16, 2022

(65) Prior Publication Data

US 2023/0078672 A1 Mar. 16, 2023

Related U.S. Application Data

(63) Continuation of application No. PCT/US2021/070903, filed on Jul. 19, 2021.

(60) Provisional application No. 63/056,153, filed on Jul. 24, 2020.

(51) Int. Cl.
*A61B 18/02* (2006.01)
*A61B 18/00* (2006.01)

(52) U.S. Cl.
CPC ...... *A61B 18/0218* (2013.01); *A61B 2018/00559* (2013.01); *A61B 2018/00577* (2013.01); *A61B 2018/0212* (2013.01); *A61B 2218/007* (2013.01)

(58) Field of Classification Search
CPC ............. A61B 18/0218; A61B 18/02; A61B 2018/00559; A61B 2018/00577; A61B 2018/0212; A61B 2018/00196; A61B 2018/0022; A61B 2018/00791; A61B 2018/0262; A61B 2018/0268; A61B 2218/007
See application file for complete search history.

(56) References Cited

U.S. PATENT DOCUMENTS

| | | | |
|---|---|---|---|
| 3,513,025 | A | 5/1970 | Gutrich |
| 3,833,001 | A | 9/1974 | Abrahams et al. |
| 2004/0025236 | A1 | 2/2004 | Hughes et al. |
| 2012/0197245 | A1 | 8/2012 | Burnett et al. |

(Continued)

FOREIGN PATENT DOCUMENTS

| | | |
|---|---|---|
| CN | 207708831 | 8/2018 |
| EP | 3359072 | 8/2018 |
| WO | WO 2022/020842 | 1/2022 |

*Primary Examiner* — Ankit D Tejani
*Assistant Examiner* — Joshua Brendon Solomon
(74) *Attorney, Agent, or Firm* — Levine Bagade Han LLP

(57) ABSTRACT

Exhaust removal apparatus and methods for cryogenic treatment are described herein. The apparatus may generally include a housing having an inlet for fluidly coupling to a source of water and an outlet for fluidly coupling to a drain, and a suction chamber in fluid communication with the housing, wherein the suction chamber is further configured to be detachably coupled to an exhaust collection reservoir having a volume of exhaust gas. Introduction of water through the inlet generates a pressure reduction within the suction chamber such that the volume of exhaust gas is drawn from the exhaust collection reservoir and into the housing for dissolving into the water and out through the drain.

20 Claims, 23 Drawing Sheets

(56) References Cited

U.S. PATENT DOCUMENTS

| | | | |
|---|---|---|---|
| 2012/0265199 A1* | 10/2012 | Curley | A61B 18/16 |
| | | | 606/41 |
| 2013/0345699 A1* | 12/2013 | Brannan | A61B 18/1206 |
| | | | 606/41 |
| 2016/0249969 A1* | 9/2016 | Santoinanni | A61B 18/02 |
| | | | 606/24 |
| 2017/0112559 A1 | 4/2017 | Sylliaasen et al. | |
| 2017/0152069 A1 | 6/2017 | Makiranta | |
| 2018/0338787 A1* | 11/2018 | Cote | A61B 90/98 |
| 2020/0114041 A1* | 4/2020 | Alas | A61M 5/31501 |

\* cited by examiner

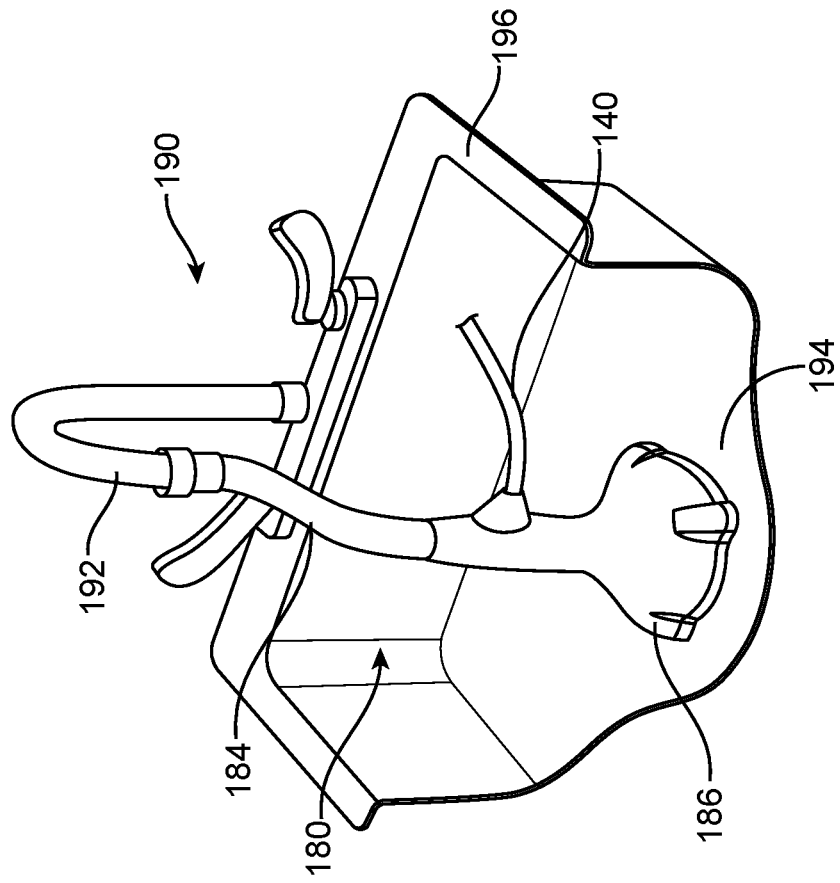
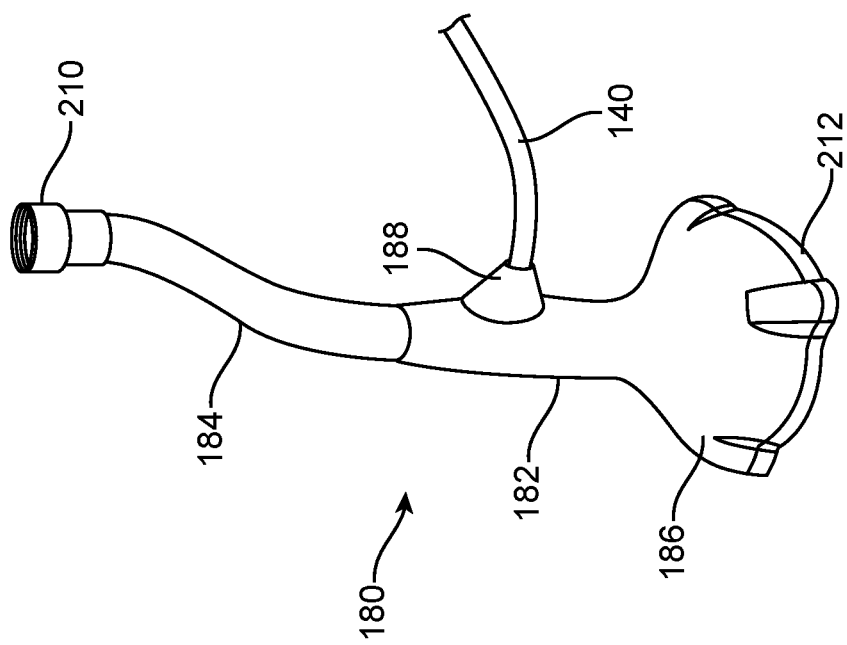
FIG. 9B
FIG. 9A

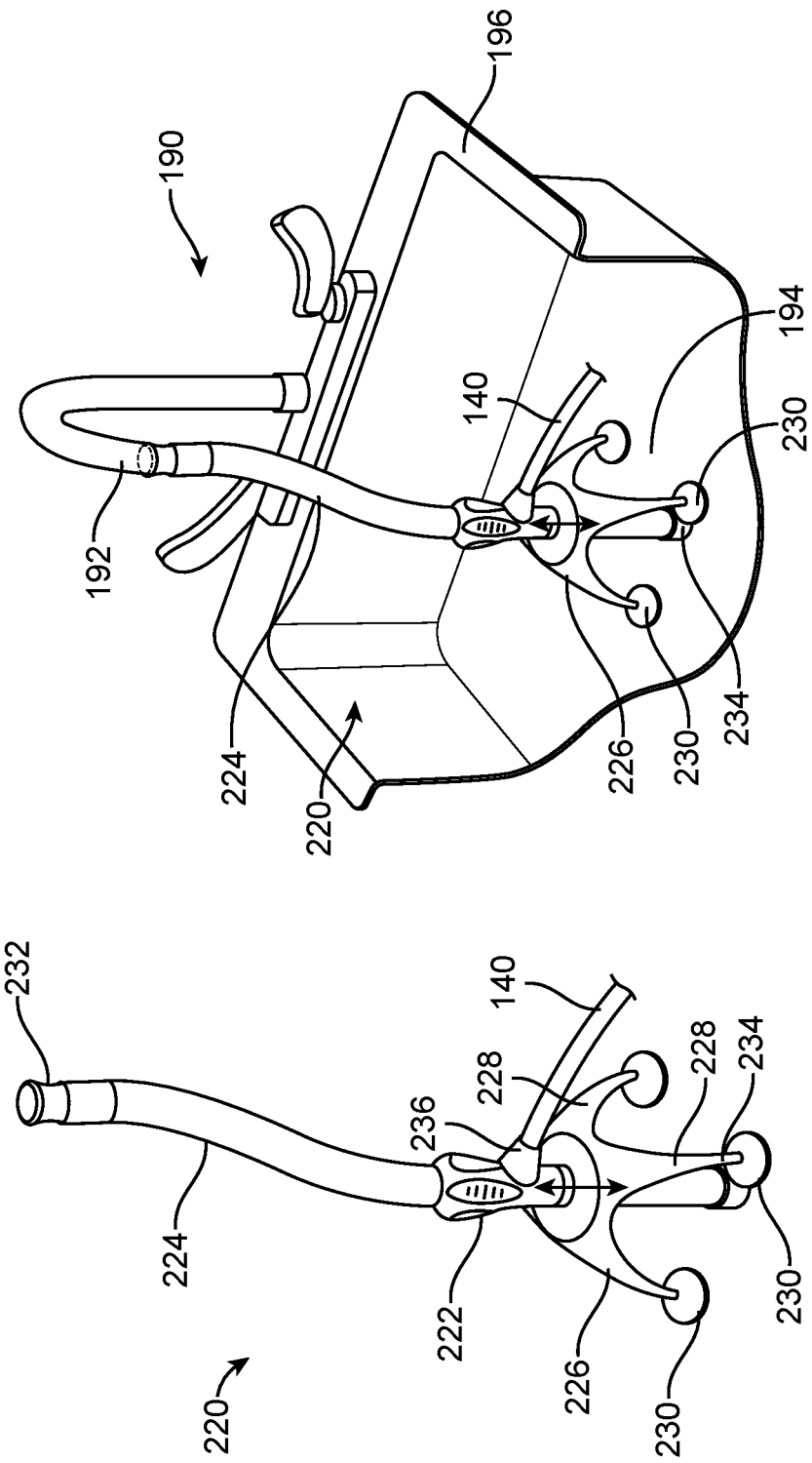

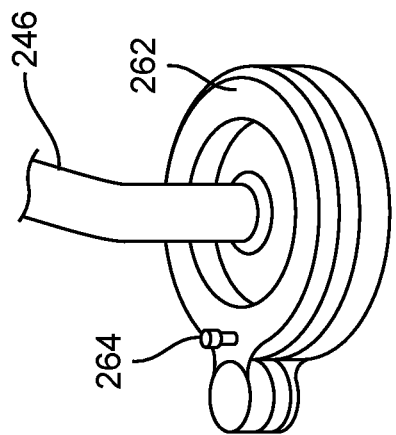
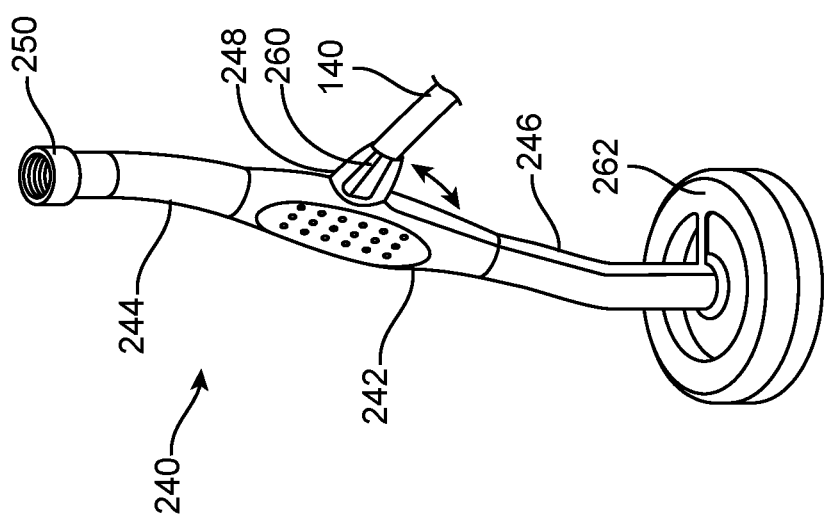
FIG. 12B
FIG. 12A

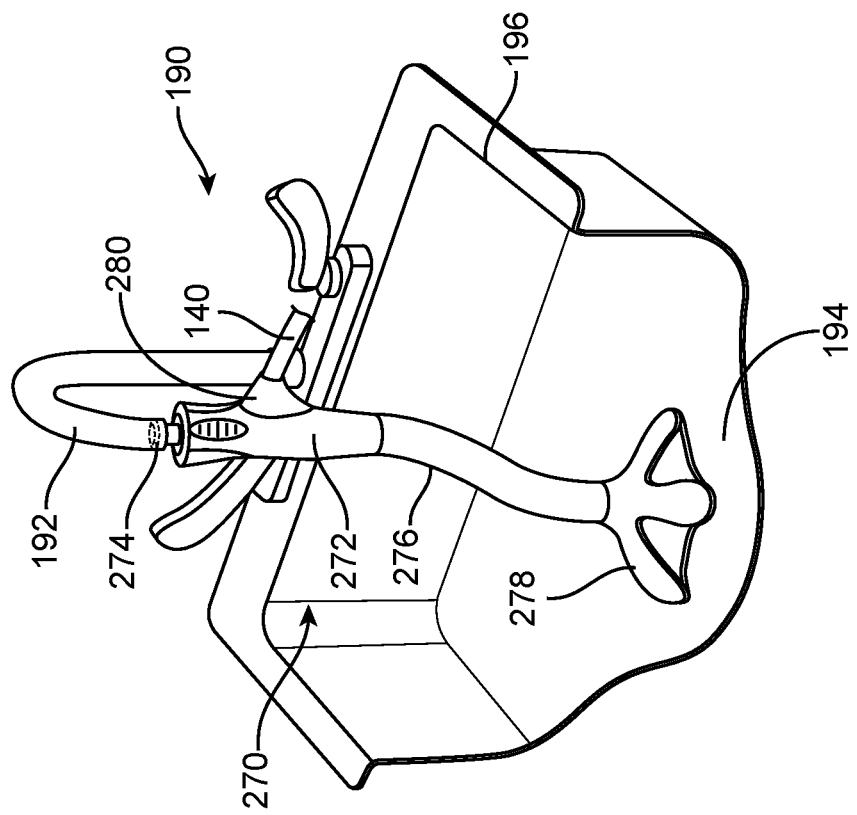
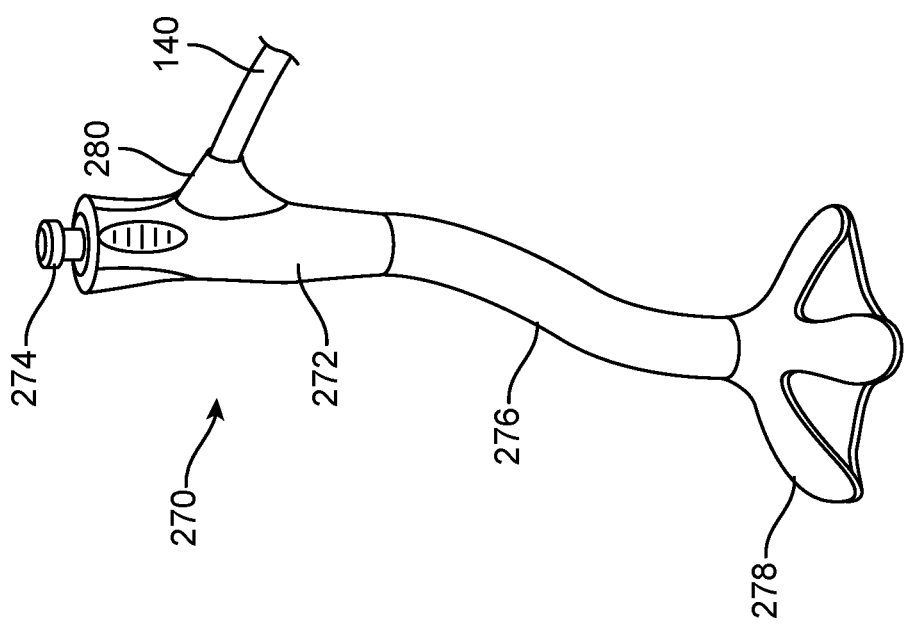
FIG. 13B
FIG. 13A

EXHAUST REMOVAL FOR CRYOGENIC TREATMENT

CROSS-REFERENCE TO RELATED APPLICATIONS

This application is a continuation of International Application No. PCT/US2021/070903 filed Jul. 19, 2021, which claims benefit of priority to U.S. Provisional Patent Application No. 63/056,153 filed Jul. 24, 2020, the contents of which are incorporated herein by reference in their entireties.

FIELD OF THE INVENTION

The present invention relates to medical devices. In particular, the present invention relates to methods and apparatus for evacuating exhaust gases generated from the cryoablative treatment of tissue regions.

BACKGROUND OF THE INVENTION

In the last few decades, therapeutic intervention within a body cavity or lumen has developed rapidly with respect to delivery of energy via radiofrequency ablation. While successful in several arenas, radiofrequency ablation has several major downsides, including incomplete ablation, frequent lack of visualization during catheter insertion, potential for overlap during treatment (with some areas receiving twice as much energy as other areas), charring of tissues and requirements for frequent debridement, frequent requirements for additional doses of energy after debridement, and potential perforation of the body cavity or lumen due to the rigidity of the RF electrodes.

Minimally invasive devices and methods which deliver thermal energy to a desired area or extract energy from a desired area can be used, in a consistent, controlled manner that does not char or inadvertently freeze certain tissues or create excessive risk of unwanted organ or lumen damage.

However, devices which utilize cryoablative fluids such as nitrous require the removal of these spent gases from the body after treatment. These exhaust gases may be collected temporarily within a scavenging system or a container but will require removal eventually. The collected exhaust gases may be vented to atmosphere but may expose the user to the gases.

Accordingly, an efficient exhaust gas removal system or method are desired for effectively removing exhaust gases after a treatment procedure.

SUMMARY OF THE INVENTION

A treatment assembly for cryoablatively treating tissue, e.g., uterine tissue, may generally comprise expanding a liner conforming it against the tissue walls of the uterus, the liner may be inflated with a gas or liquid. Once the elongate shaft has been introduced through the cervix and into the uterus, the distal opening of the shaft may be positioned distal to the internal os and the liner may be deployed either from within the shaft or from an external sheath. The cooling probe may be introduced into the liner interior. As the cryoablative agent (e.g., cryoablative fluid) is introduced into and distributed throughout the liner interior, the exhaust catheter may also define one or more openings to allow for the cryoablative fluid to vent or exhaust from the interior of the liner.

With the discharged cryoablative fluid in a completely gaseous state, the evacuating exhaust line may be vented to the surrounding environment or optionally coupled to a scavenging system to collect the discharged gas to limit exposure. In one variation, an exhaust collection bag may be supported by a pole and connected to the exhaust line for collecting the exhaust fluids or gases. The evacuating exhaust line may be removably coupled to the collection bag via a tubing connector located near or at a bottom of the collection bag.

Once an ablation treatment has been completed and the resulting exhaust gases captured in the bag, the spent nitrous gas (e.g., nitrous oxide gas) may be vented from the bag and into atmosphere. However, the bag may also be evacuated through the plumbing system of the suite or room in which the bag is located by dissolving the nitrous gas into water which may be drained directly into the sink. In this manner, the nitrous gas may vent directly from the bag and into the sink drain without requiring any venting into atmosphere or exposure to any personnel. The drained mixture of water and nitrous gas may accordingly be removed via the plumbing system while the mixture remains at environmentally acceptable levels.

Generally, the evacuation assembly may comprise an assembly housing through which the fluid lines are enclosed. The assembly housing may be positioned within a sink and may include an inlet tubing coupled to the housing for fluidly coupling to a water faucet. The assembly housing may further include a base integrated with the assembly housing for attachment over or in fluid communication with a drain within the sink basin. With the bag filled with the exhaust nitrous gas, the faucet may be turned on to start the flow of water from the faucet so that the water enters inlet tubing, passes through assembly housing where the water flow may be constricted to reduce the pressure, and continues into drain. The constricted fluid flow creates a low pressure within a suction attachment extending from the housing to create a Venturi effect. This low pressure created within the suction attachment may then suction the exhaust gas from the bag, through exhaust line, and into contact with the water flowing through the housing where the exhaust gas may dissolve into the flowing water for draining directly into the drain.

While the evacuation assembly is described as being attached or attachable to the exhaust bag, the evacuation assembly (or any of the assembly variations herein) may alternatively be fluidly coupled directly to the treatment assembly for drawing the exhaust gas directly from the device during a treatment procedure. Moreover, the evacuation assembly may also be used in any number of other procedures where nitrous exhaust gases are created, such as cardiac ablation procedures, or any other cryogenic procedure and other gases aside from nitrous may also be used with the evacuation assembly as so desired.

One variation of the cryogenic exhaust removal apparatus, the apparatus may generally comprise a housing having an inlet for fluidly coupling to a source of water and an outlet for fluidly coupling to a drain, and a suction chamber in fluid communication with the housing, wherein the suction chamber is further configured to be detachably coupled to an exhaust collection reservoir having a volume of exhaust gas. Introduction of water through the inlet generates a pressure reduction within the suction chamber such that the volume of exhaust gas is drawn from the exhaust collection reservoir and into the housing for dissolving into the water and out through the drain.

One variation for a method of evacuating cryogenic exhaust may generally comprise receiving a flow of water through an inlet of a housing, passing the flow of water through the housing such that a pressure within a suction chamber is reduced, drawing a volume of cryogenic exhaust into the suction chamber via the reduced pressure such that the cryogenic exhaust dissolves into the flow of water, and passing the flow of water and dissolved cryogenic exhaust into a drain.

Another variation of the cryogenic exhaust removal system may generally comprise a housing having an inlet for fluidly coupling to a source of water and an outlet for fluidly coupling to a drain, a suction chamber in fluid communication with the housing, wherein the suction chamber is further configured to be detachably coupled to an exhaust collection reservoir having a volume of exhaust gas, wherein introduction of water through the inlet generates a pressure reduction within the suction chamber such that the volume of exhaust gas is drawn from the exhaust collection reservoir and into the housing for dissolving into the water and out through the drain, and an exhaust collection apparatus containing the volume of exhaust gas for fluidly coupling to the suction chamber via an exhaust line.

BRIEF DESCRIPTION OF THE DRAWINGS

FIGS. 9A and 9B show perspective views of one variation of the evacuation assembly detached from the sink and also attached within the sink.

FIGS. 10A and 10B show perspective views of another variation of the evacuation assembly having a slidable attachment mechanism detached from the sink and also attached within the sink.

FIGS. 12A and 12B show perspective views of another variation of the evacuation assembly having a diverter switch for creating a suction within a base detached from the sink and also attached within the sink.

FIGS. 13A and 13B show perspective views of another variation of the evacuation assembly having a housing which can be coupled directly to the faucet detached from the sink and also attached within the sink.

DETAILED DESCRIPTION OF THE INVENTION

Figure 1A:
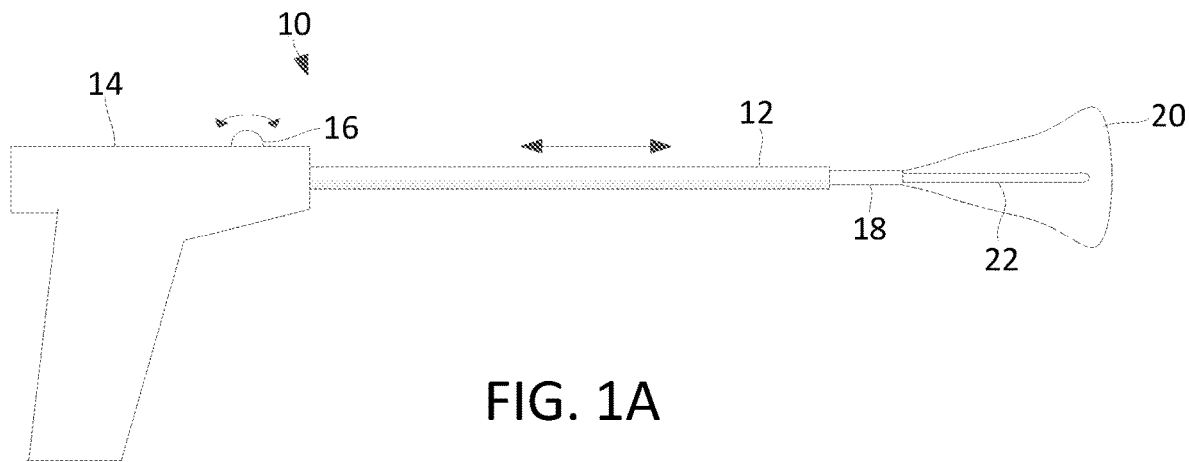
FIG. 1A shows a side view of an integrated treatment assembly.

The cooling probe 22 as well as the balloon assembly may be variously configured, for instance, in an integrated treatment assembly 10 as shown in the side view of FIG. 1A. In this variation, the assembly 10 may integrate the elongate shaft 18 having the liner or balloon 20 extending therefrom with the cooling probe 22 positioned translatably within the shaft 18 and liner 20. A separate translatable sheath 12 may be positioned over the elongate shaft 18 and both the elongate shaft 18 and sheath 12 may be attached to a handle assembly 14. The handle assembly 14 may further comprise an actuator 16 for controlling a translation of the sheath 12 for liner 20 delivery and deployment.

Figure 1B:
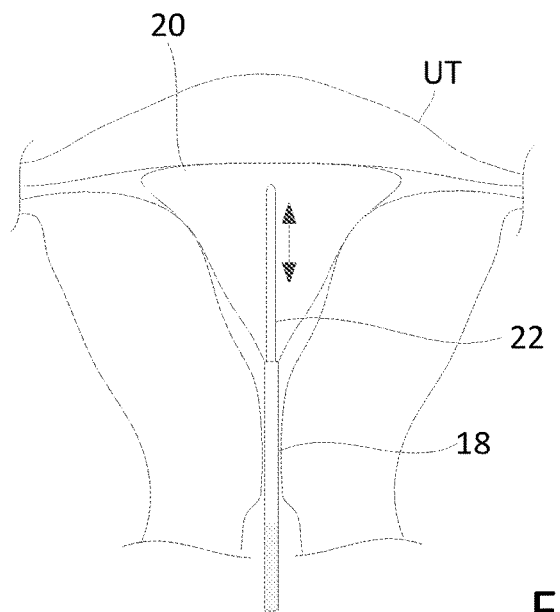
FIG. 1B shows an example of the assembly advanced through the cervix and into the uterus where the sheath may be retracted via the handle assembly to deploy the balloon.

With the sheath 12 positioned over the elongate shaft 18 and liner 20, the assembly 10 may be advanced through the cervix and into the uterus UT where the sheath 12 may be retracted via the handle assembly 14 to deploy the liner 20, as shown in FIG. 1B. As described above, once the liner 20 is initially deployed from the sheath 12, it may be expanded by an initial burst of a gas, e.g., air, carbon dioxide, etc., or by the cryoablative fluid. In particular, the tapered portions of the liner 20 may be expanded to ensure contact with the uterine cornu. The handle assembly 14 may also be used to actuate and control a longitudinal position of the cooling probe 22 relative to the elongate shaft 18 and liner 20 as indicated by the arrows.

Figure 1C:
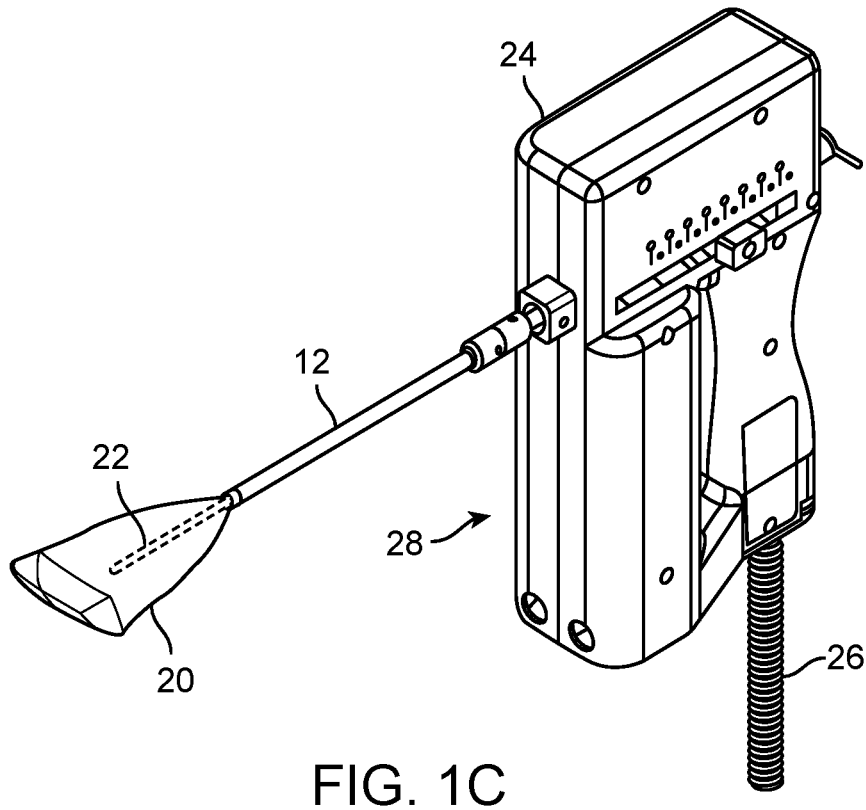
FIG. 1C shows a perspective view of a cryoablation assembly having a handle assembly which may integrate the electronics and pump assembly within the handle itself.

In another variation of the treatment assembly, FIG. 1C shows a perspective view of a cryoablation assembly having a handle assembly 24 which may integrate the electronics and pump assembly 28 within the handle itself. An exhaust tube 26 may also be seen attached to the handle assembly 24 for evacuating exhausted or excess cryoablative fluid or gas from the liner 20. Any of the cryoablative fluids or gases described herein may be utilized, e.g., compressed liquid-to-gas phase change of a compressed gas such as nitrous oxide ($N_2O$), carbon dioxide ($CO_2$), Argon, etc. The cooling probe 22 may be seen extending from sheath 12 while surrounded or enclosed by the liner or balloon 20. Hence, the handle assembly 24 with coupled cooling probe 22 and liner 20 may provide for a single device which may provide for pre-treatment puff-up or inflation of the liner 20, active cryoablation treatment, and/or post-treatment thaw cycles.

The handle assembly 24 may also optionally incorporate a display for providing any number of indicators and/or alerts to the user. For instance, an LCD display may be provided on the handle assembly 24 (or to a separate control unit connected to the handle assembly 24) where the display counts down the treatment time in seconds as the ablation is occurring. The display may also be used to provide measured pressure or temperature readings as well as any number of other indicators, symbols, or text, etc., for alerts, instructions, or other indications. Moreover, the display may be configured to have multiple color-coded outputs, e.g., green, yellow, and red. When the assembly is working through the ideal use case, the LED may be displayed as a solid green color. When the device requires user input (e.g. when paused and needing the user to press the button to re-start treatment) the LED may flash or display yellow. Additionally, when the device has faulted and treatment is stopped, the LED may flash or display a solid red color.

Figure 1D:
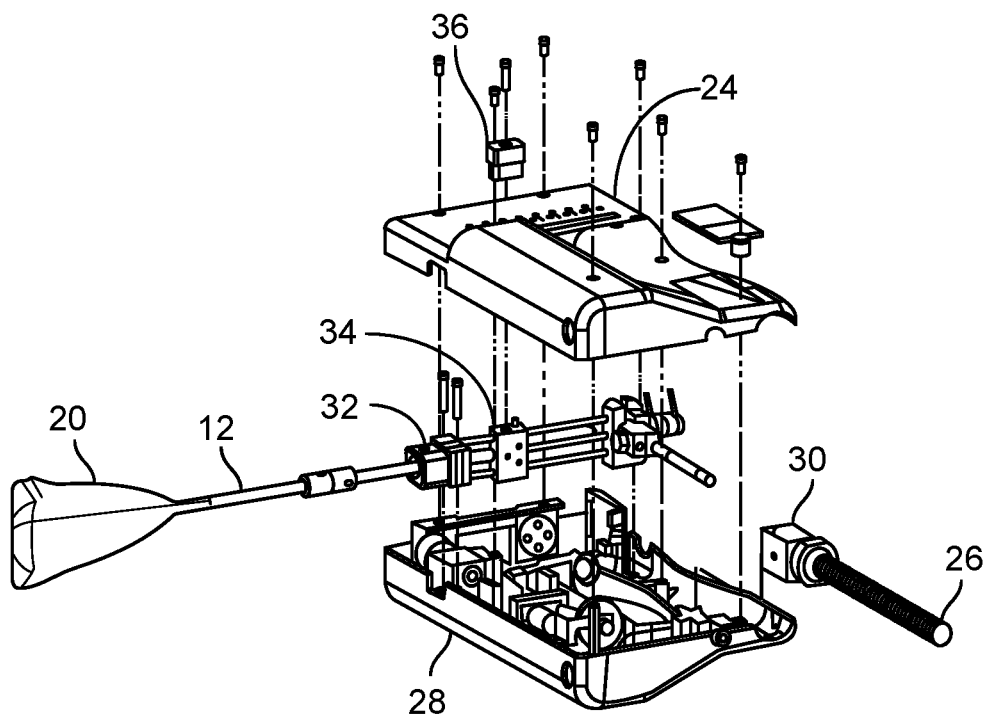
FIG. 1D shows the handle assembly in a perspective exploded view illustrating some of the components which may be integrated within the handle.

FIG. 1D shows the handle assembly 24 in a perspective exploded view to illustrate some of the components which may be integrated within the handle 24. As shown, the liner 20 and sheath 12 may be coupled to a sheath bearing assembly 32 and slider base block assembly 34 for controlling the amount of exposed treatment length along the cooling probe 22 (and as described in further detail below). An actuatable sheath control 36 may be attached to the slider base block assembly 34 for manually controlling the treatment length of the cooling probe 22 as well. Along with the electronics and pump assembly 28 (which may optionally incorporate a programmable processor or controller in electrical communication with any of the mechanisms within the handle 24), an exhaust valve 30 (e.g., actuated via a solenoid) may be coupled to the exhaust line 26 for controlling not only the outflow of the exhausted cryoablation fluid or gas but also for creating or increasing a backpressure during treatment, as described in further detail below.

Figure 1E:
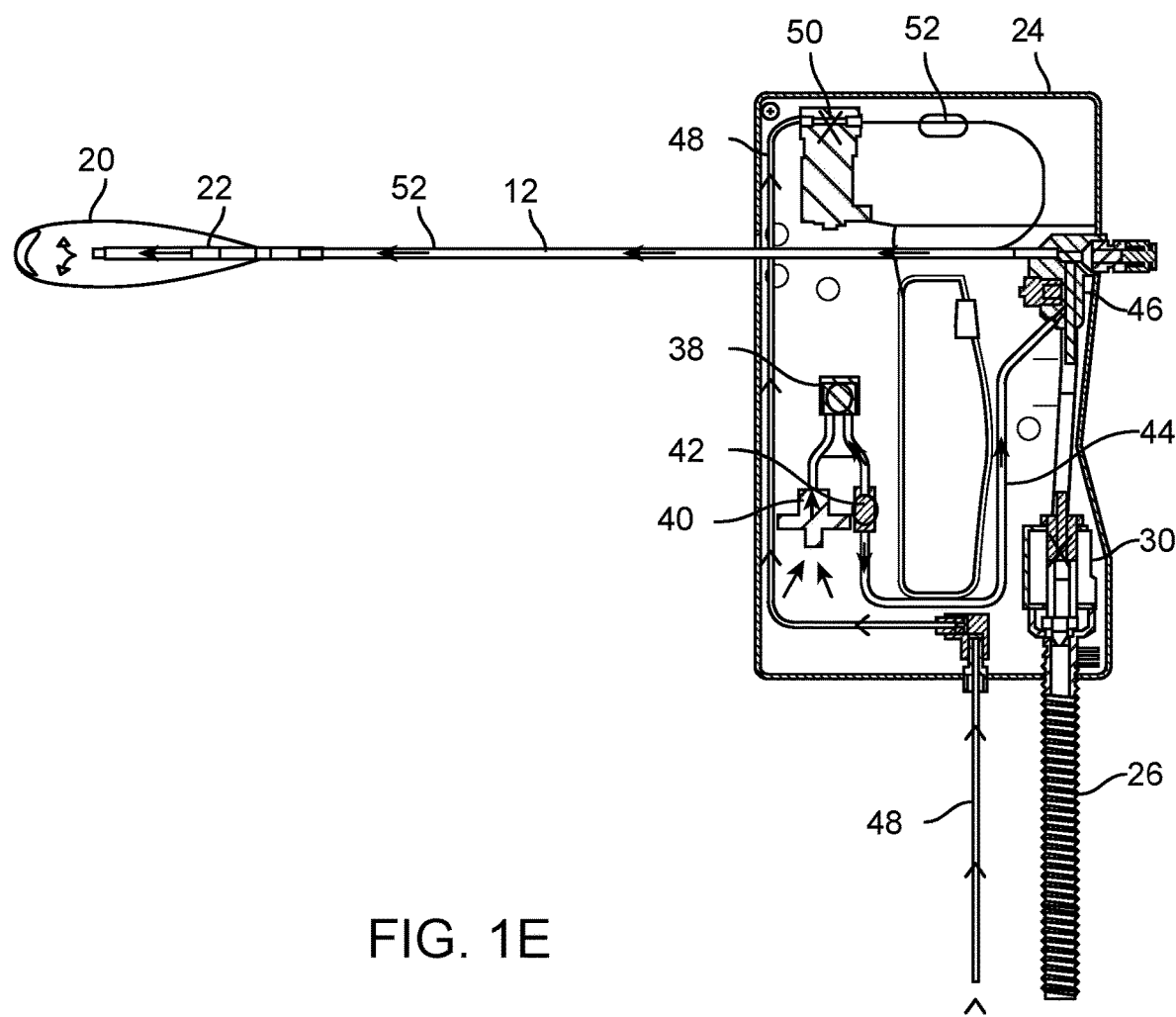
FIG. 1E shows an example of the system operation during a pre-treatment puff up process.
Figure 1F:
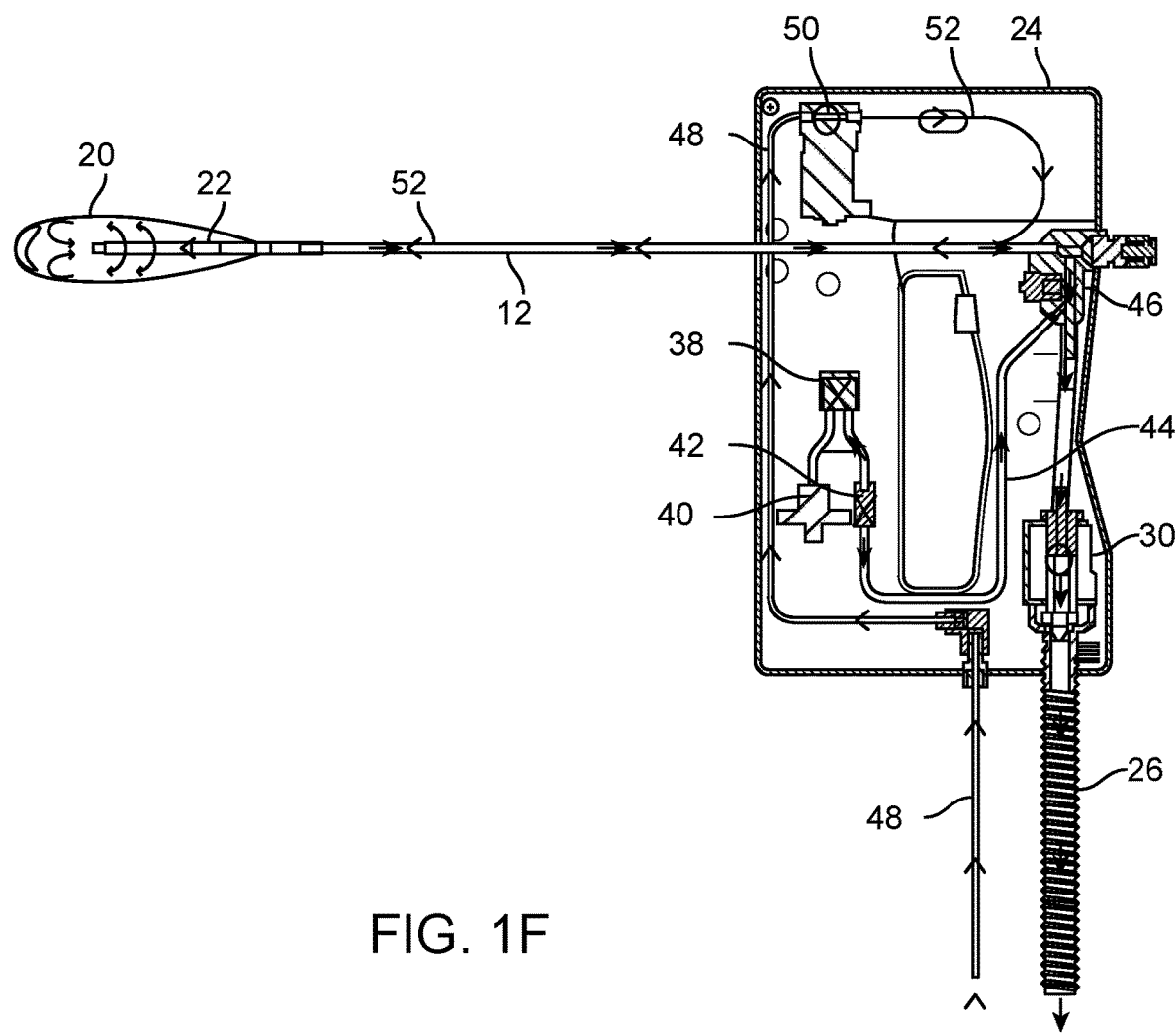
FIG. 1F shows an example of the system operation during a treatment process.
Figure 1G:
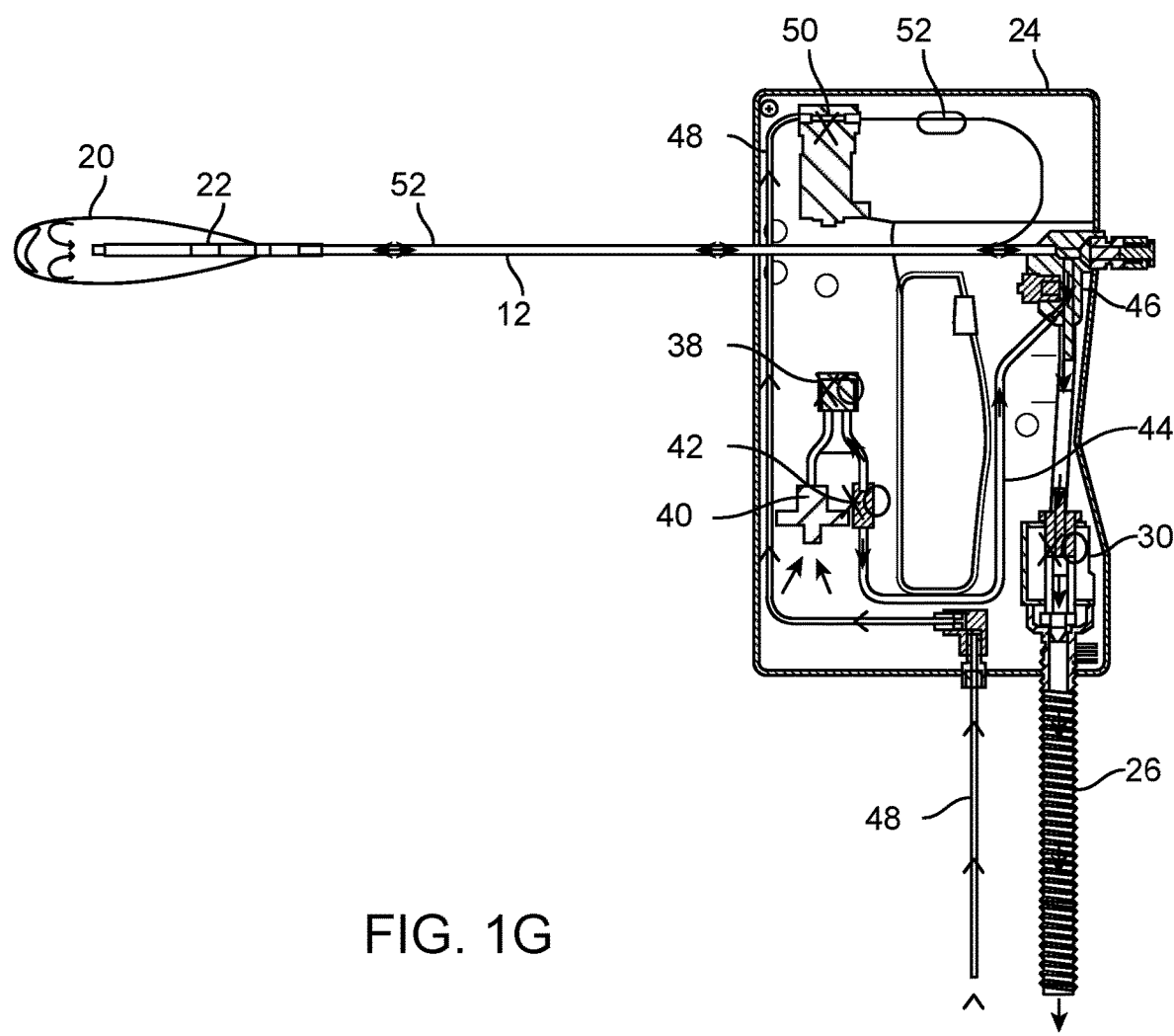
FIG. 1G shows an example of the system operation during a thawing and venting process.

In one example of how the handle assembly 24 may provide for treatment, FIGS. 1E to 1G illustrate schematic side views of how the components may be integrated and utilized with one another. As described herein, once the sheath 12 and/or liner 20 has been advanced and initially introduced into the uterus, the liner 20 may be expanded or inflated in a pre-treatment puff up to expand the liner 20 into contact against the uterine tissue surfaces in preparation for a cryoablation treatment. As illustrated in the side view of FIG. 1E, a pump 38 integrated within the handle assembly 24 may be actuated and a valve 42 (e.g., actuatable or passive) fluidly coupled to the pump 38 may be opened (as indicated schematically by an "O" over both the pump 38 and valve 42) such that ambient air may be drawn in through, e.g., an air filter 40 integrated along the handle 24, and passed through an air line 44 within the handle and to an exhaust block 46. The exhaust block 46 and air line 44 may be fluidly coupled to the tubular exhaust channel which extends from the handle 24 which is further attached to the cooling probe 22. As the air is introduced into the interior of the liner 20 (indicated by the arrows), the liner 20 may be expanded into contact against the surrounding uterine tissue surface.

A cryoablative fluid line 48 also extending into and integrated within the handle assembly 24 may be fluidly coupled to an actuatable valve 50, e.g., actuated via a solenoid, which may be manually closed or automatically closed (as indicated schematically by an "X" over the valve 50) by a controller to prevent the introduction of the cryoablative fluid or gas into the liner 20 during the pre-treatment liner expansion. An infusion line 52 may be fluidly coupled to the valve 50 and may also be coupled along the length of the sheath 12 and probe 22, as described in further detail below. The exhaust valve 30 coupled to the exhaust line 26 may also be closed (as indicated schematically by an "X" over the valve 30) manually or automatically by the controller to prevent the escape of the air from the exhaust block 46.

During this initial liner expansion, the liner 20 may be expanded in a gradual and controlled manner to minimize any pain which may be experienced by the patient in opening the uterine cavity. Hence, the liner 20 may be expanded gradually by metering in small amounts of air. Optionally, the pump 38 may be programmed and controlled by a processor or microcontroller to expand the liner 20 according to an algorithm (e.g., e.g. ramp-up pressure quickly to 10 mm Hg and then slow-down the ramp-up as the pressure increases to 85 mm Hg) which may be stopped or paused by the user. Moreover, the liner 20 may be expanded to a volume which is just sufficient to take up space within the uterine cavity. After the initial increase in pressure, the pressure within the liner 20 may be optionally increased in bursts or pulses. Moreover, visualization (e.g., via a hysteroscope or abdominal ultrasound) may be optionally used during the controlled gradual expansion to determine when the uterine cavity is fully open and requires no further pressurization. In yet another variation, the liner 20 may be cyclically inflated and deflated to fully expand the liner. The inflations and deflations may be partial or full depending upon the desired expansion.

In yet another alternative variation, the system could also use an amount of air pumped into the liner 20 as a mechanism for detecting whether the device is in a false passage of the body rather than the uterine cavity to be treated. The system could use the amount of time that the pump 38 is on to track how much air has been pushed into the liner 20. If the pump 38 fails to reach certain pressure levels within a predetermined period of time, then the controller may indicate that the device is positioned within a false passage. There could also be a limit to the amount of air allowed to be pushed into the liner 20 as a way to detect whether the probe 22 has been pushed, e.g., out into the peritoneal cavity. If too much air is pushed into the liner 20 (e.g., the volume of air tracked by the controller exceeds a predetermined level) before reaching certain pressures, then the controller may indicate the presence of a leak or that the liner 20 is not fully constrained by the uterine cavity. The liner 20 may also incorporate a release feature which is configured to rupture if the liner 20 is not constrained such that if the system attempts to pump up the liner 20 to treatment pressure (e.g., 140 mmHg), the release feature will rupture before reaching that pressure.

Once the liner 20 has been expanded sufficiently into contact against the uterine tissue surface, the cryoablation treatment may be initiated. As shown in the side view of FIG. 1F, the air pump 38 may be turned off and the valve 42 may be closed (as indicated schematically by an "X" over the pump 38 and valve 42) to prevent any further infusion of air into the liner 20. With the cryoablative fluid or gas pressurized within the line 48, valve 50 may be opened (as indicated schematically by an "O" over the valve 50) to allow for the flow of the cryoablative fluid or gas to flow through the infusion line 52 coupled to the valve 50. Infusion line 52 may be routed through or along the sheath 12 and along the probe 22 where it may introduce the cryoablative fluid or gas within the interior of liner 20 for infusion against the liner 20 contacted against the surrounding tissue surface.

During treatment or afterwards, the exhaust valve 30 may also be opened (as indicated schematically by an "O" over the valve 30) to allow for the discharged fluid or gas to exit or be drawn from the liner interior and proximally through the cooling probe 22, such as through the distal tip opening. The fluid or gas may exit from the liner 20 due to a pressure differential between the liner interior and the exhaust exit and/or the fluid or gas may be actively drawn out from the liner interior, as described in further detail herein. The spent fluid or gas may then be withdrawn proximally through the probe 22 and through the lumen surrounded by the sheath 12, exhaust block 46, and the exhaust tube 26 where the spent fluid or gas may be vented. With the treatment fluid or gas thus introduced through infusion line 52 within the liner 20 and then withdrawn, the cryoablative treatment may be applied uninterrupted.

Once a treatment has been completed, the tissue of the uterine cavity may be permitted to thaw. During this process, the cryoablative fluid delivery is halted through the infusion line 52 by closing the valve 50 (as indicated schematically by an "X" over the valve 50) while continuing to exhaust for any remaining cryoablative fluid or gas remaining within the liner 20 through probe 22, through the lumen surrounded by sheath 12, and exhaust line 26, as shown in FIG. 1G. Optionally, the pump 38 and valve 42 may be cycled on and off and the exhaust valve 30 may also be cycled on and off to push ambient air into the liner 20 to facilitate the thawing of the liner 20 to the uterine cavity. Optionally, warmed or room temperature air or fluid (e.g., saline) may also be pumped into the liner 20 to further facilitate thawing of the tissue region.

As the spent cryoablative fluid or gas is removed from the liner 20, a drip prevention system may be optionally incorporated into the handle. For instance, a passive system incorporating a vented trap may be integrated into the handle which allows exhaust gas to escape but captures any vented liquid. The exhaust line 26 may be elongated to allow for any vented liquid to evaporate or the exhaust line 26 may be convoluted to increase the surface area of the exhaust gas tube to promote evaporation.

Alternatively, an active system may be integrated into the handle or coupled to the handle 24 where a heat sink may be connected to a temperature sensor and electrical circuit which is controlled by a processor or microcontroller. The heat sink may promote heat transfer and causes any liquid exhaust to evaporate. When the temperature of the heat sink reaches the boiling temperature of, e.g., nitrous oxide (around −86° C.), the handle may be configured to slow or stop the delivery of the cryoablative fluid or gas to the uterine cavity.

The pre-treatment infusion of air as well as the methods for treatment and thawing may be utilized with any of the liner, probe, or apparatus variations described herein. Moreover, the pre-treatment, treatment, or post-treatment procedures may be utilized altogether in a single procedure or different aspects of such procedures may be used in varying combinations depending upon the desired results.

Additionally and/or optionally, the handle 24 may incorporate an orientation sensor to facilitate maintaining the handle 24 in a desirable orientation for treatment. One variation may incorporate a ball having a specific weight covering the exhaust line 26 such that when the handle 24 is held in the desirable upright orientation, the treatment may proceed uninterrupted. However, if the handle 24 moved out of its desired orientation, the ball may be configured to roll out of position and trigger a visual and/or auditory alarm to alert the user. In another variation, an electronic gyroscopic sensor may be used to maintain the handle 24 in the desired orientation for treatment.

Figure 2A:
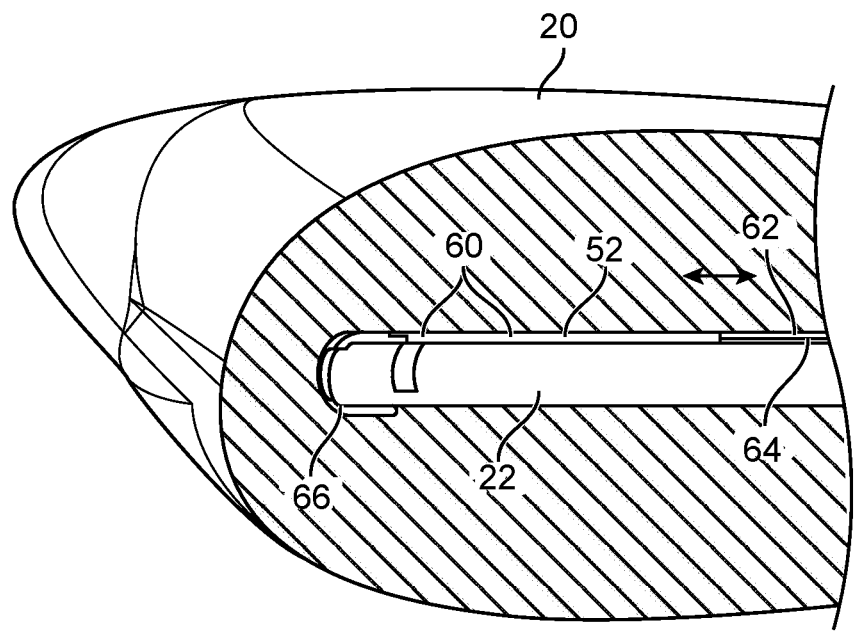
FIGS. 2A and 2B show cross-sectional side views of yet another variation of a cooling probe which utilizes a single infusion line in combination with a translatable delivery line.
Figure 2B:
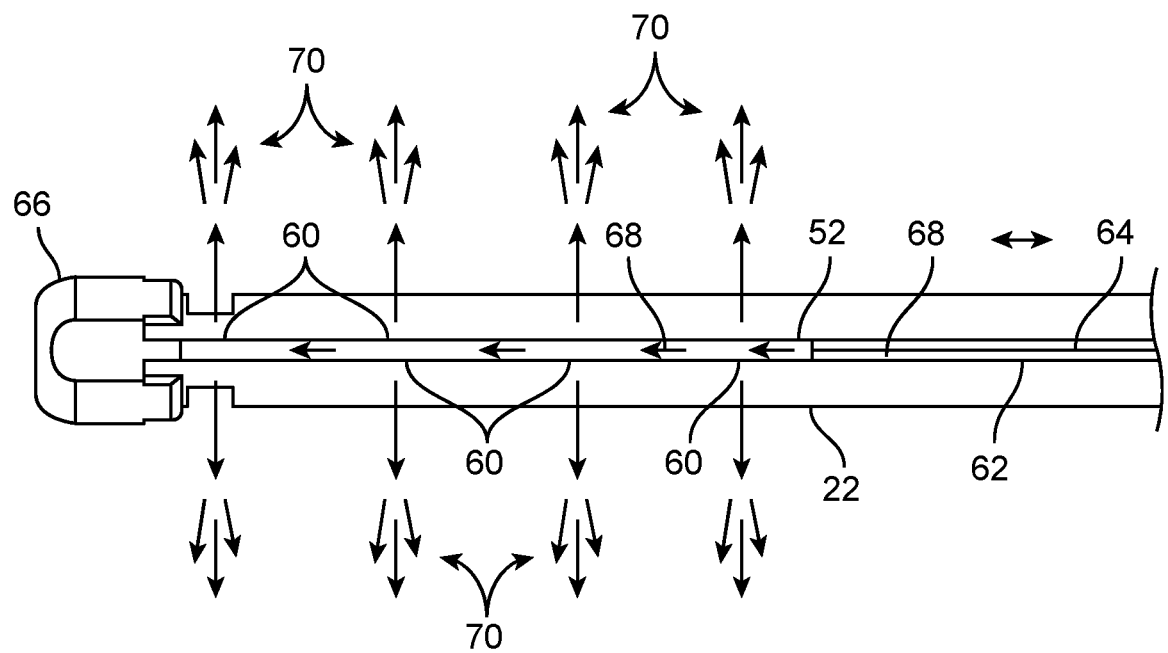

FIGS. 2A and 2B show cross-sectional side views of yet another variation of a cooling probe which utilizes a single infusion line in combination with a translatable delivery line. To accommodate various sizes and shapes of uterine cavities, the cooling probe may have a sliding adjustment that may be set, e.g., according to the measured length of the patient's uterine cavity. The adjustment may move along the sheath along the exhaust tube as well as the delivery line within the infusion line. The sheath may constrain the liner 20 and also control its deployment within the cavity.

In this variation, an infusion line 52 (as described above) may pass from the handle assembly and along or within the sheath and into the interior of liner 20. The infusion line 52 may be aligned along the probe 22 such that the infusion line 52 is parallel with a longitudinal axis of the probe 22 and extends towards the distal tip 66 of the probe 22. Moreover, the infusion line 52 may be positioned along the probe 22 such that the line 52 remains exposed to the corners of the liner 20 which extend towards the cornua. With the infusion line 52 positioned accordingly, the length of the line 52 within the liner 20 may have multiple openings formed along its length which act as delivery ports for the infused cryoablative fluid or gas. A separate translating delivery line 64, e.g., formed of a Nitinol tube defining an infusion lumen therethrough, may be slidably positioned through the length of the infusion line 52 such that the delivery line 64 may be moved (as indicated by the arrows in FIG. 2A) relative to the infusion line 52 which remains stationary relative to the probe 22.

The openings along the length of the infusion line 52 may be positioned such that the openings are exposed to the sides of the interior of the liner 20, e.g., cross-drilled. As the cryoablative fluid or gas is introduced through the delivery line 64, the infused cryoablative fluid or gas 68 may pass through the infusion line 52 and then out through the openings defined along the infusion line 52. By adjusting the translational position of the delivery line 64, the delivery line 64 may also cover a selected number of the openings resulting in a number of open delivery ports 60 as well as closed delivery ports 62 which are obstructed by the delivery line 64 position relative to the infusion line 52, as shown in the top view of FIG. 2B.

By translating the delivery line 64 accordingly, the number of open delivery ports 60 and closed delivery ports 62 may be adjusted depending on the desired treatment length and further ensures that only desired regions of the uterine tissue are exposed to the infused cryoablative fluid or gas 68. Once the number of open delivery ports 60 has been suitably selected, the infused cryoablative fluid or gas 68 may bypass the closed delivery ports 62 obstructed by the delivery line 64 and the fluid or gas may then be forced out through the open delivery ports 60 in a transverse direction as indicated by the infusion spray direction 70. The terminal end of the infusion line 52 may be obstructed to prevent the distal release of the infused fluid or gas 68 from its distal end. Although in other variations, the terminal end of the infusion line 52 may be left unobstructed and opened.

Figure 3A:
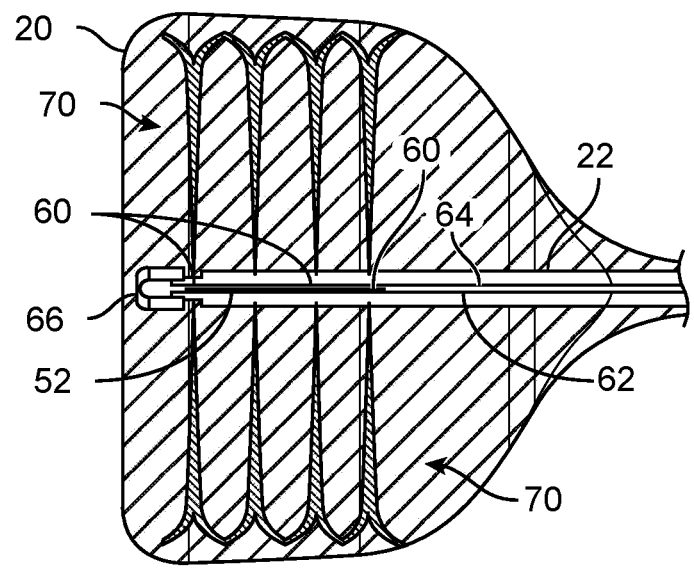
FIGS. 3A and 3B show top and perspective views of the expanded liner with four pairs of the open delivery ports exposed in apposed direction.
Figure 3B:
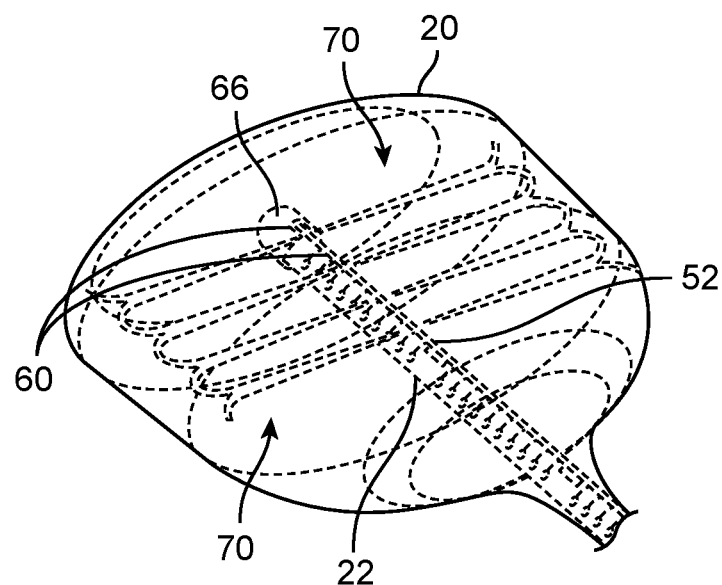

FIGS. 3A and 3B show top and perspective views of the expanded liner 20 with four pairs of the open delivery ports 60 exposed in apposed direction. Because the infused fluid or gas 68 may be injected into the liner 20, e.g., as a liquid, under relatively high pressure, the injected cryoablative liquid may be sprayed through the open delivery ports 60 in a transverse or perpendicular direction relative to the cooling probe 22. The laterally infused cryoablative fluid 70 may spray against the interior of the liner 20 (which is contacted against the surrounding tissue surface) such that the cryoablative liquid 70 coats the interior walls of the liner 20 due to turbulent flow causing heavy mixing. As the cryoablative liquid 70 coats the liner surface, the sprayed liquid 70 may absorb heat from the tissue walls causing rapid cooling of the tissue while also evaporating the liquid cryogen to a gas form that flows out through the cooling probe 22. This rapid cooling and evaporation of the cryoablative liquid 70 facilitates the creation of a fast and deep ablation over the tissue. During treatment, the temperature within the cavity typically drops, e.g., −86° C., within 2-3 seconds after the procedure has started. While the interior walls of the liner 20 are first coated with the cryoablative liquid 70, a portion of the cryoablative liquid 70 may no longer change phase as the procedure progresses.

While four pairs of the open delivery ports 60 are shown, the number of exposed openings may be adjusted to fewer than four pairs or more than four pairs depending on the positioning of the delivery line 64 and also the number of openings defined along the infusion line 52 as well as the spacing between the openings. Moreover, the positioning of the openings may also be adjusted such that the sprayed liquid 70 may spray in alternative directions rather than laterally as shown. Additionally and/or alternatively, additional openings may be defined along other regions of the infusion line 52.

Further variations of the treatment assembly features and methods which may be utilized in combination with any of the features and methods described herein may be found in the following patent applications:

U.S. patent application Ser. No. 13/361,779 filed Jan. 30, 2012 (US Pub. 2012/0197245);
U.S. patent application Ser. No. 13/900,916 filed May 23, 2013 (US Pub. 2013/0296837);
U.S. patent application Ser. No. 14/019,898 filed Sep. 6, 2013 (US Pub. 2014/0012156);
U.S. patent application Ser. No. 14/019,928 filed Sep. 6, 2013 (US Pub. 2014/005648);
U.S. patent application Ser. No. 14/020,265 filed Sep. 6, 2013 (US Pub. 2014/0005649);
U.S. patent application Ser. No. 14/020,306 filed Sep. 6, 2013 (US Pub. 2014/0025055);
U.S. patent application Ser. No. 14/020,350 filed Sep. 6, 2013 (US Pub. 2014/0012244);
U.S. patent application Ser. No. 14/020,397 filed Sep. 6, 2013 (US Pub. 2014/0012243);
U.S. patent application Ser. No. 14/020,452 filed Sep. 6, 2013 (US Pub. 2014/0005650);
U.S. patent application Ser. No. 14/086,050 filed Nov. 21, 2013 (US Pub. 2014/0074081);
U.S. patent application Ser. No. 14/086,088 filed Nov. 21, 2013 (US Pub. 2014/0088579);
U.S. patent application Ser. No. 14/029,641 filed Sep. 17, 2013 (US Pub. 2015/0080869); and
U.S. patent application Ser. No. 14/265,799 filed Apr. 30, 2014 (US Pub. 2015/0289920).

Each of the patent applications above is incorporated herein by reference in its entirety and for any purpose herein.

Figure 4A:
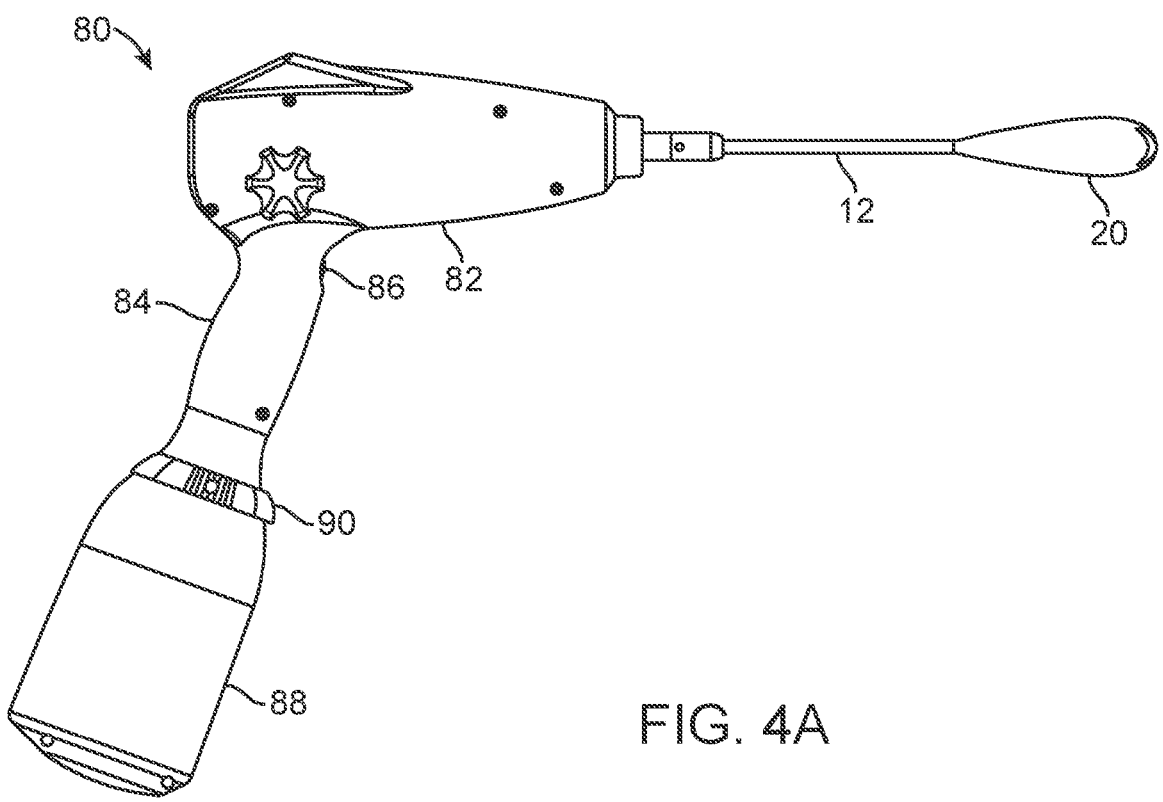
FIGS. 4A to 4C show side and assembly views of another variation of the treatment assembly.
Figure 4B:
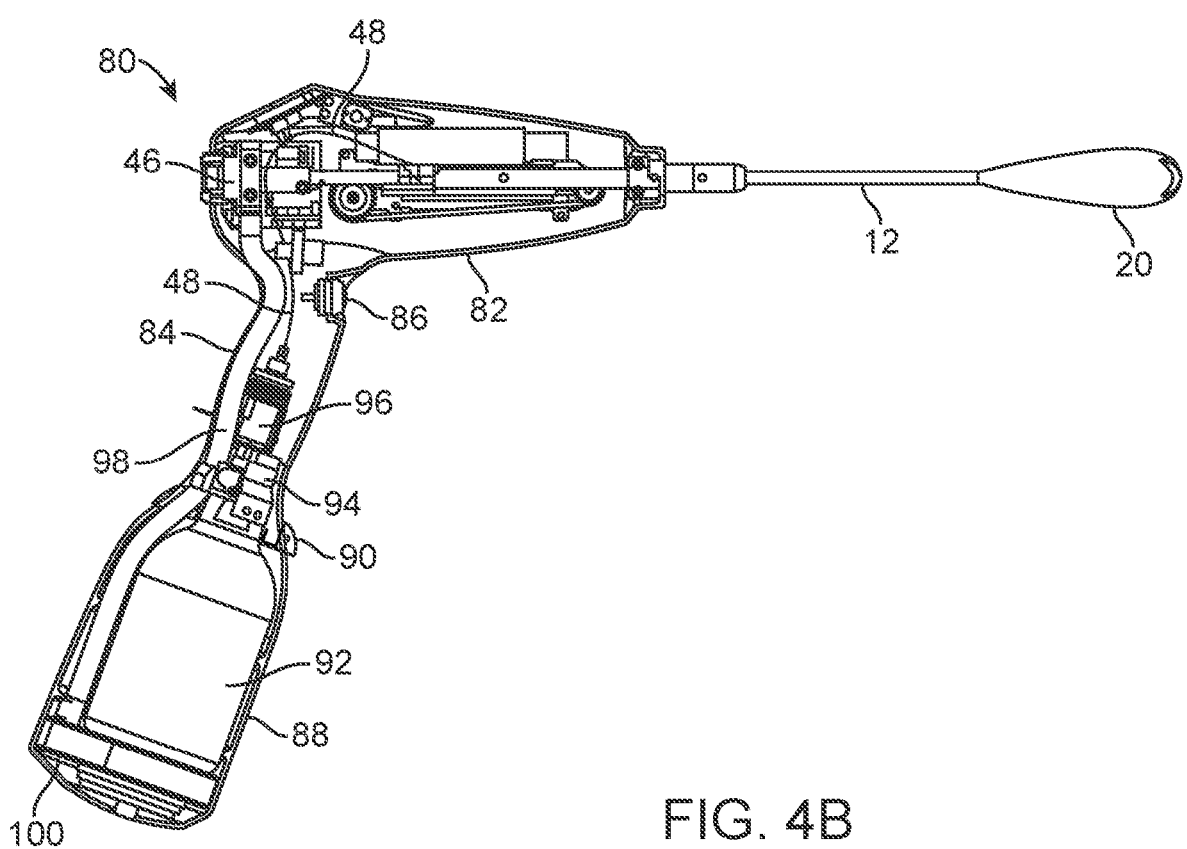
Figure 4C:
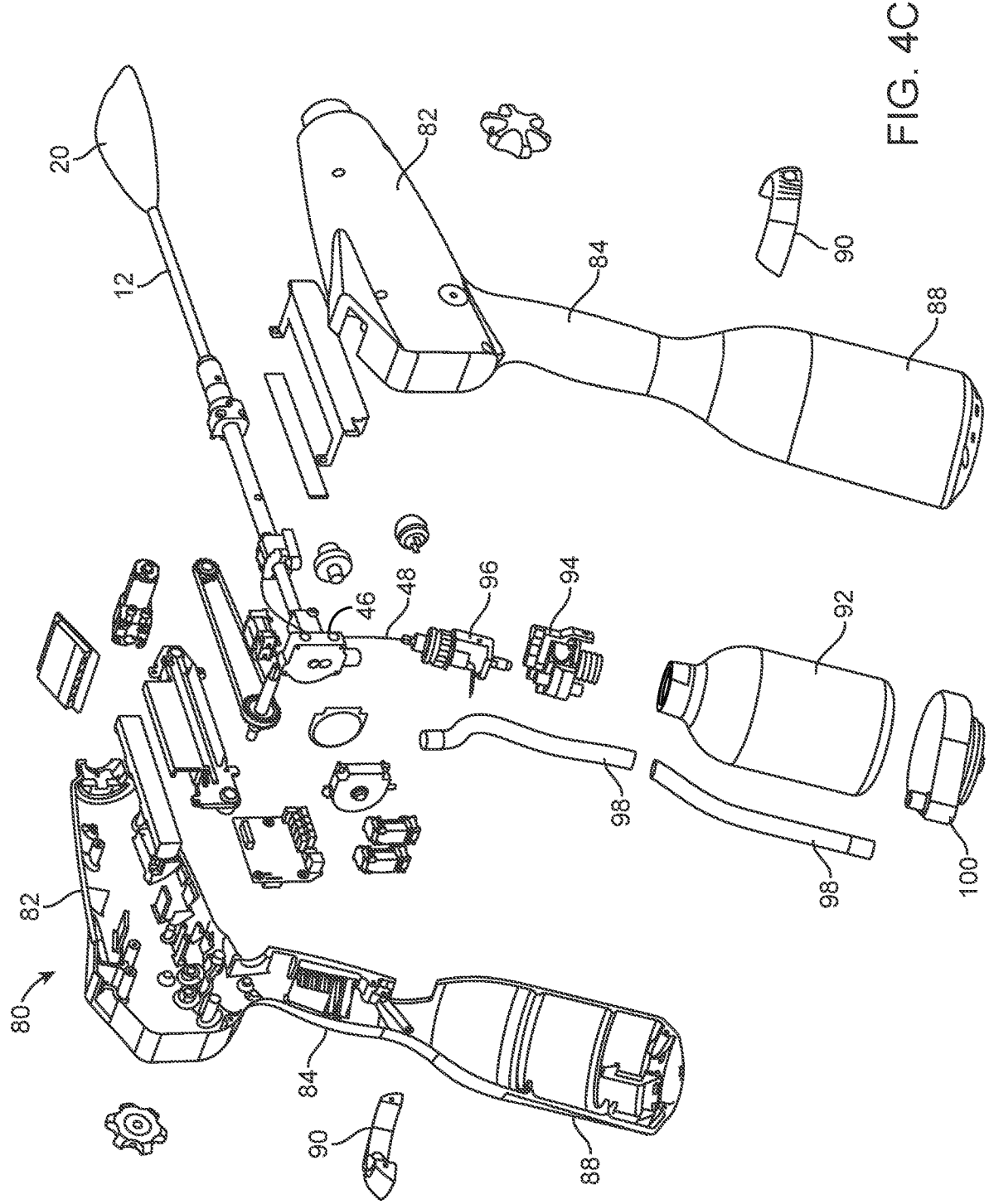

Yet another variation of the treatment assembly 80 is shown in the side and partial cross-sectional side views of FIGS. 4A and 4B which illustrate a housing 82 having a handle 84 and a reservoir housing 88 extending from and attached directly to the handle 84. FIG. 4C further illustrates a perspective assembly view of the treatment assembly 80 and some of its components contained internally.

The sheath 12 having the liner 20 may extend from the housing 82 while an actuator 86 may be located, for instance, along the handle 84 to enable the operator to initiate the cryoablative treatment. A reservoir or canister 92 fully containing the cryoablative agent (as described herein) may be inserted and retained within the reservoir housing 88. The reservoir housing 88 and/or the handle 84 may further incorporate a reservoir engagement control 90 which may be actuated, e.g., by rotating the control 90 relative to the handle 84, to initially open fluid communication with the reservoir or canister 92 to charge the system for treatment.

The reservoir or canister 92 may be inserted into the reservoir housing 88 and into secure engagement with a reservoir or canister valve 94 which may be coupled to the reservoir engagement control 90. The valve 94 may be adjusted to open the reservoir or canister 92 for treatment or for venting of the discharged cryoablative agent during or after treatment. An inflow modulation control unit 96 (e.g., an actuatable solenoid mechanism) may be coupled directly to the reservoir or canister valve 94 and the cryoablative fluid line 48 may be coupled directly to the modulation control unit 96 and through the sheath 12 and into fluid communication within the liner 20, as described herein.

During or after treatment, the discharged cryoablative fluid may be evacuated through the exhaust block 46 contained within the housing and then through the exhaust line 98 coupled to the exhaust block 46. The exhaust line 98 may extend through the handle 84 and the reservoir housing 88 and terminate at an exhaust line opening 100 which may be attached to another exhaust collection line.

Figure 5A:
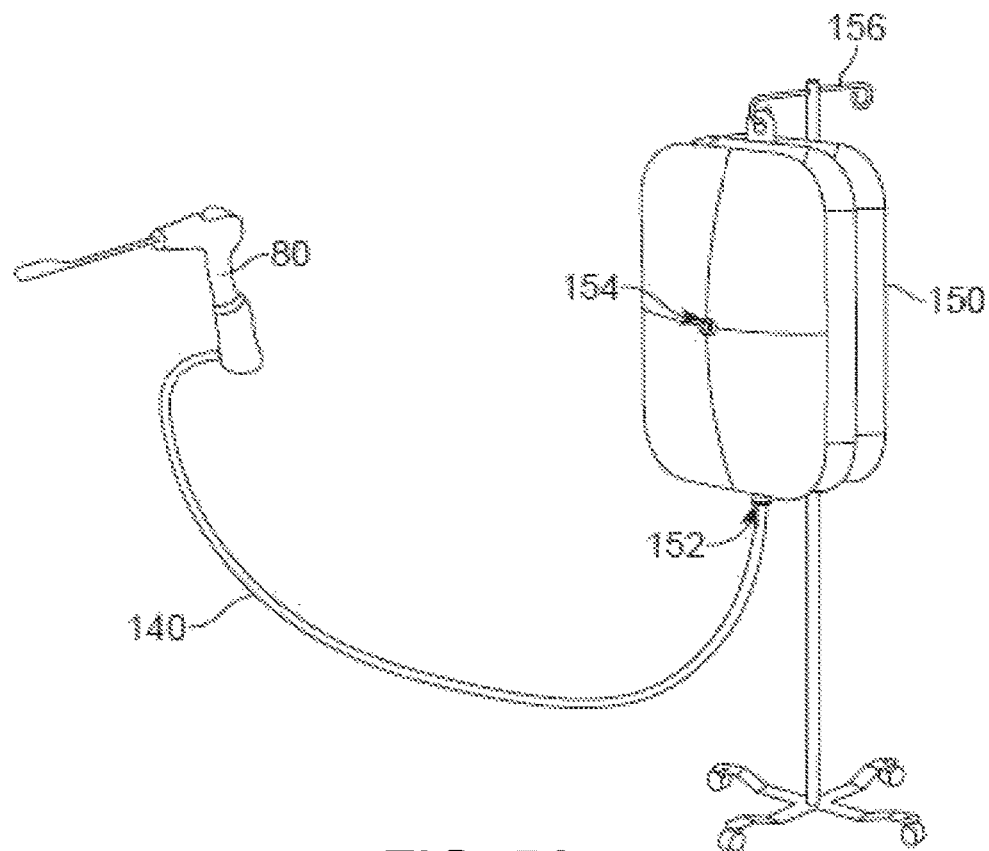
FIGS. 5A and 5B show examples of collection systems which can be used to collect the discharged liquid or gas.
Figure 5B:
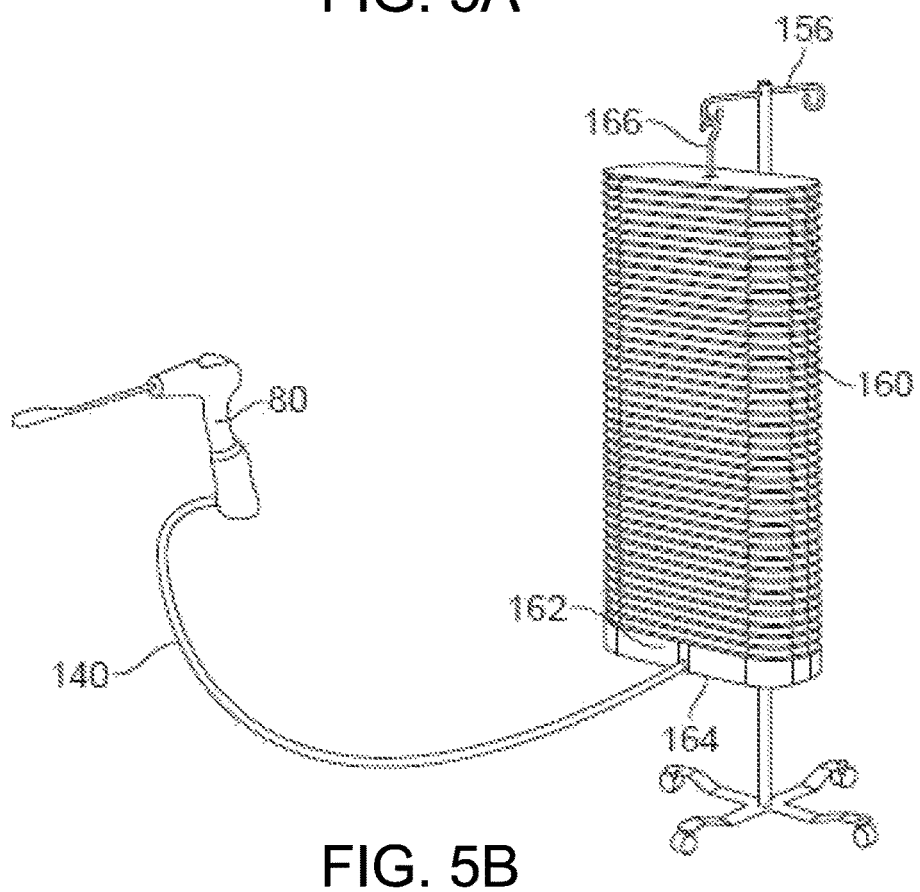

With the discharged cryoablative agent in a completely gaseous state, the evacuating exhaust line 140 may be vented to the surrounding environment or optionally coupled to a scavenging system to collect the discharged gas to limit exposure. FIGS. 5A and 5B show assembly views of examples of collection bags which may be optionally used with the treatment assembly. Scavenging systems may incorporate features such as orifices or valves to prevent any vacuum applied by the scavenging unit from interfering with the backpressure within the treatment device.

FIG. 5A shows an inflating collection bag 150 which is expandable in width coupled to the evacuating exhaust line 140 via a disconnect valve 152 (e.g., unidirectional valve). The collection bag 150, which may be reusable or disposable, may be supported via a pole 156 and may also incorporate a release plug 154 which may allow for the venting of the collected gas during or after a treatment procedure is completed.

Similarly, FIG. 5B shows an accordion-type collector 160 also supported via a pole 156 and a connector 166 attached to the collector 160. The evacuating exhaust line 140 may be removably coupled to the collector 160 via a disconnect valve 162 (e.g., unidirectional valve) and may also incorporate a release plug 164 for venting any collected gas during or after a treatment procedure. The vertically-expanding collector 160 may define a hollow passageway through the center of the vertical bellows which allows for the connector 166 (e.g., rigid rod or flexible cord) to pass through and support the base of the collector 160. The connector 166 also prevents the collector 160 from falling over to a side when inflating. As the gas enters through the bottom of the collector 160, the bellow may inflate upward.

Figure 6:
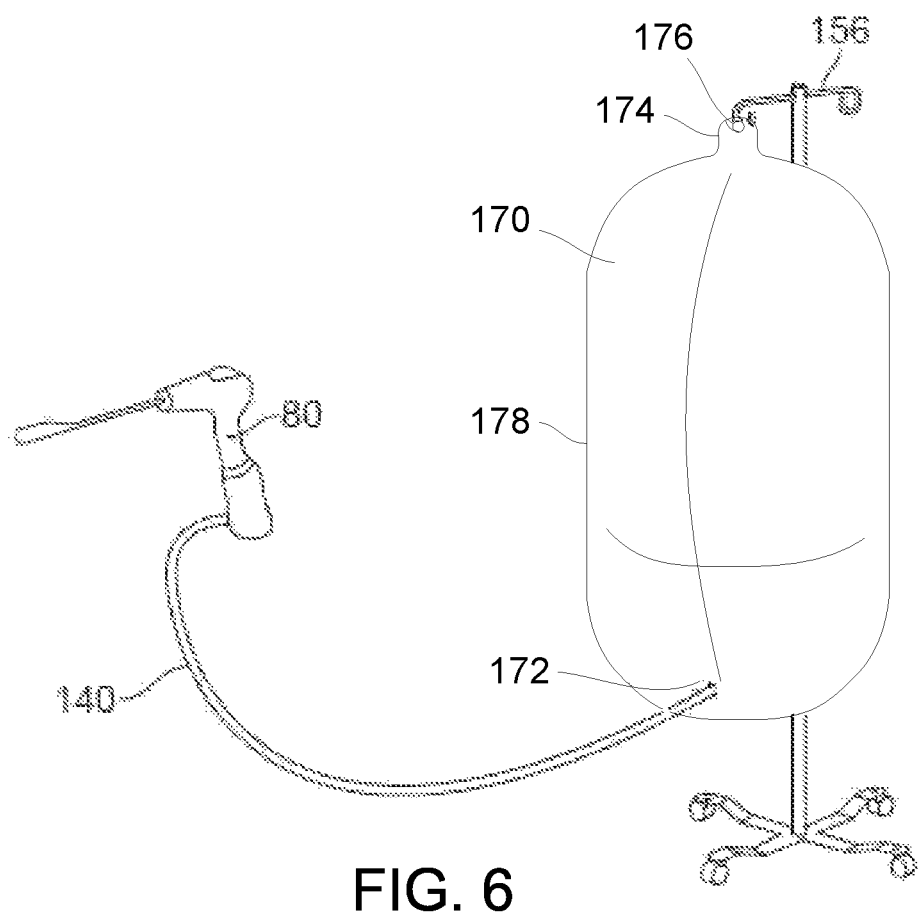
FIG. 6 shows another example of collection system utilizing a bag for collecting the discharged liquid or gas.

In yet another variation, FIG. 6 shows an exhaust collection bag 170 which may also be supported by the pole 156. The evacuating exhaust line 140 may be removably coupled to the collection bag 170 via a tubing connector 172 located near or at a bottom of the collection bag 170. The bag 170 itself may be formed from two layers of a lubricious materials which are attached or welded (e.g., RF dielectric welded) around its periphery along its edges 178. Moreover, the collection bag 170 may be configured to form an extension 174 which projects from the bag 170 and forms an opening 176 for passing a hook through or to provide a point for attachment. This opening may be reinforced to support, e.g., 2 lbs for at least 1 hour. The collection bag 170 may be designed to hang, e.g., from an IV pole as shown such that it is maintained off the floor to keep it clean should a user want to reuse it a number of times.

The bag 170 may be fabricated from, e.g., a polyurethane film, selected for its lubricity, elasticity, clarity, low cost and ability to be RF dielectric welded. Such polyurethane films may be commercially available from API Corporation (DT 2001-FM). The film may have a thickness of, e.g., 0.003 inches. Because the bag 170 inflates at relatively low pressures, the lubricity of the layers prevents the layers of film from sticking together and allows the bag to readily inflate. Also, to accommodate potential volume increases associated with increased temperatures, the bag 170 material also exhibits elasticity, e.g., film elongation may be on the order of 800%. The bag may be fabricated to have a burst pressure of at least greater than or equal to, e.g., ≥3 psi. The bag 170 may also be fabricated so as to be at least partially transparent so that the clarity of the bag results in an object that visually occupies less space in the procedure room because objects can be seen through it. The bag 170 and its variations are described in further detail in U.S. patent application Ser. No. 15/288,766 filed Oct. 7, 2016 (U.S. Pub. 2017/0112559), which is incorporated herein in its entirety and for any purpose.

Once an ablation treatment has been completed and the resulting exhaust gases captured in the bag 170, the spent nitrous gas (e.g., nitrous oxide gas) may be vented from the bag 170 and into atmosphere. However, the bag 170 may also be evacuated through the plumbing system of the suite or room in which the bag 170 is located by dissolving the nitrous gas into water which may be drained directly into the sink. In this manner, the nitrous gas may vent directly from the bag 170 and into the sink drain without requiring any venting into atmosphere or exposure to any personnel. The drained mixture of water and nitrous gas may accordingly be removed via the plumbing system while the mixture remains at environmentally acceptable levels.

The bag 170 and any of its various embodiments and treatment devices may be utilized in any combination with the exhaust evacuation systems disclosed herein.

Figure 7:
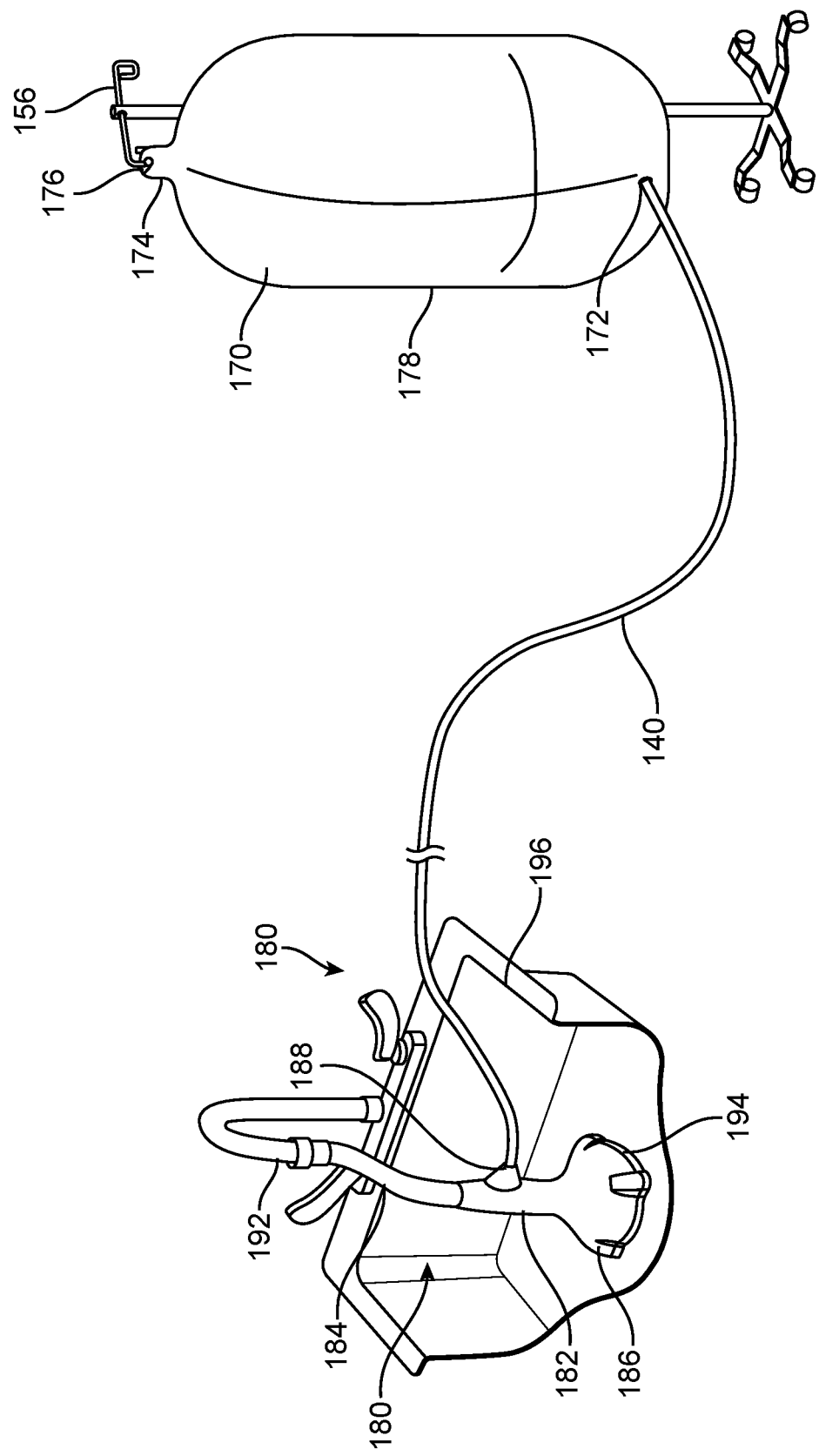
FIG. 7 illustrates one example of how the contents of the spent exhaust gas contained within the bag may be dissolved directly into water for draining into a sink of the room in which the bag is located.

FIG. 7 illustrates one example of how the contents of the spent exhaust gas contained within the bag 170 may be dissolved directly into water for draining, e.g., into a sink of the room in which the bag 170 is located. The evacuating exhaust line 140, as shown in FIG. 6, may be decoupled from the treatment assembly 80 and attached to an evacuation assembly 180 while the line 140 remains fluidly coupled to the bag 170. Alternatively, a separate line may be coupled between the bag 170 and the evacuation assembly 180.

The evacuation assembly 180 may generally comprise an assembly housing 182 through which the fluid lines are enclosed. The assembly housing 182 may be positioned within a sink 190 and may include an inlet tubing 184 coupled to the housing 182 for fluidly coupling to a water faucet 192. The assembly housing 182 may further include a base 186 integrated with the assembly housing 182 for attachment over or in fluid communication with a drain 194 within the sink basin 196. With the bag 170 filled with the exhaust nitrous gas, the faucet may be turned on to start the flow of water from the faucet 192 so that the water enters inlet tubing 184, passes through assembly housing 182 where the water flow may be constricted to reduce the pressure, and continues into drain 194. The constricted fluid flow creates a low pressure within a suction attachment 188 extending from the housing 182 to create a Venturi effect. This low pressure created within the suction attachment 188 may then suction the exhaust gas from the bag 170, through exhaust line 140, and into contact with the water flowing through the housing 182 where the exhaust gas may dissolve into the flowing water for draining directly into the drain 194.

While the evacuation assembly 180 is described as being attached or attachable to the exhaust bag 170, the evacuation assembly 180 (or any of the assembly variations herein) may alternatively be fluidly coupled directly to the treatment assembly 80 for drawing the exhaust gas directly from the device during a treatment procedure. Moreover, the evacuation assembly 180 may also be used in any number of other procedures where nitrous exhaust gases are created, such as cardiac ablation procedures, or any other cryogenic procedure and other gases aside from nitrous may also be used with the evacuation assembly 180 as so desired.

Figure 8B:
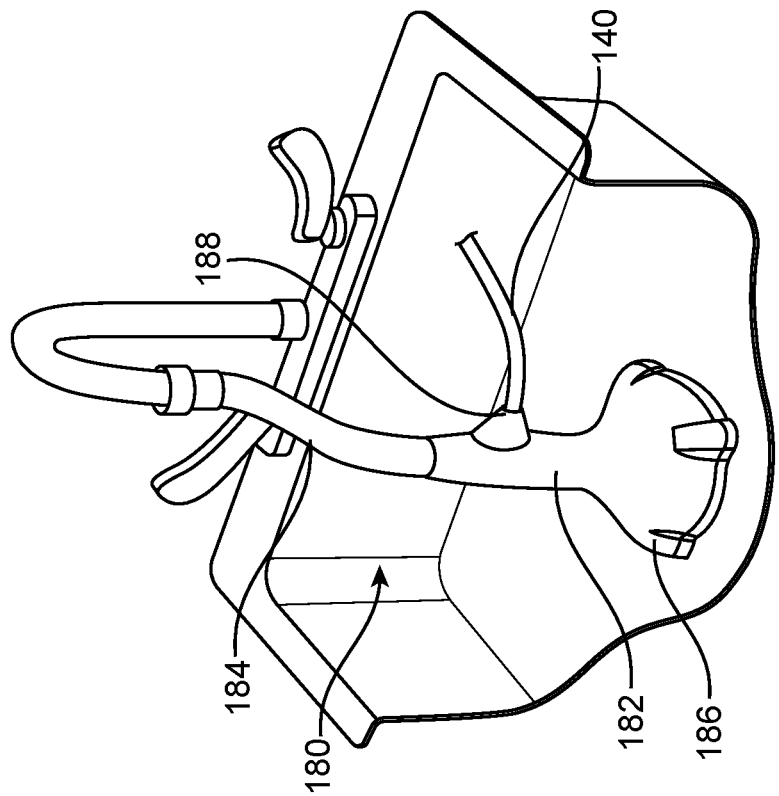
FIGS. 8A and 8B schematically illustrates the flow path through the assembly housing against an example of an evacuation assembly.
Figure 8A:
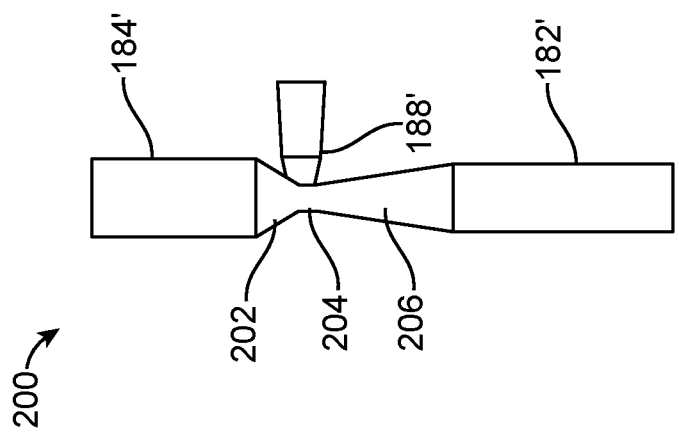

FIG. 8A schematically illustrates the flow path through the assembly housing 182, which is shown in FIG. 8B for reference. The flow assembly 200 is illustrated with the inlet 184' corresponding to the inlet tubing 184. A contraction section 202 may reduce the cross-sectional area of the inlet 184' and continue through a throat section 204 which may increase through a diffuser section 206 and which continues to an outlet 182' for exiting into the drain 194. The suction chamber 188' may be fluidly coupled to the exhaust line 140 for directly drawing the exhaust gas from the bag 170 and into the suction chamber 188' where the gas may dissolve directly into the water passing through the flow assembly 200.

In order to create the Venturi effect with the flow assembly 200, the cross-sectional areas of the inlet 184' and outlet 182' as well as the cross-sectional areas of the contraction section 202, throat section 204, and diffuser section 206 may be varied depending upon the desired suction rate for draining the exhaust gas.

In one variation, with an inlet water temperature of 74° F. (23° C.) and a flow rate of 2.1 GPM (Gallon Per Min.) from the faucet 192, a sufficient suction force may be generated by the flow assembly 200 to create an exhaust flow rate of 17 SCFH (Standard Cubic Feet Per Hour) at standardized conditions of temperature and pressure through the exhaust line 140. For a given volume of the bag 170, the flow assembly 200 may completely empty the bag 170 of the exhaust gas within 13 min. A flow rate of 1.5 GPM of water from the faucet 192 and through the flow assembly 200 may generate an exhaust flow rate of 10 SCFH through the exhaust line 140 and a flow rate of 1 GPM of water through the flow assembly 200 may generate an exhaust flow of about 4 SCFH through the exhaust line 140. If the temperature of the inlet water were increased to, e.g., 118° F. (48° C.), the corresponding exhaust flow rate may be 16 SCFH.

In alternative variations of the flow assembly 200, with the inlet water flow rate of 2.1 GPM, the exhaust flow rate may be increased to, e.g., 25 SCFH. Other variations of the design of the flow assembly 200 may be altered to increase or decrease the corresponding exhaust flow rate.

While the temperature of the water may not have a significant effect on the suction force generated to draw the exhaust gas, the water temperature as well as the temperature of the exhaust gas (e.g., nitrous oxide) may have an effect on the solubility of the gas. As the temperature of the water and/or gas decreases, the solubility of the gas increases. Hence, the temperature of the water and/or gas may be potentially altered or varied depending upon the desired solubility and rate of dissolution of the gas into the water flow. For instance, if the exhaust gas dissolves into the water flow at too slow of a rate as the exhaust is drawn into the housing by the suction force, the undissolved gas may build and potentially escape from beneath the base 186 or drain 194 rather than being dissolved into the water and passing into and through the drain 194.

Accordingly, the suction pressure generated by the Venturi effect may be tuned to combine the water flow and exhaust gas (e.g., nitrous oxide) in the proper solubility ratio to minimize the quantity of water and time needed to dissolve the exhaust gas in the water and empty the exhaust collection bag 170. If the Venturi effect (suction force) is too high, too much nitrous oxide gas may be drawn into the housing 182 and remain in gaseous form which could build up pressure beneath the sealing base 186 and cause the exhaust gas to escape from the perimeter of the base 186. Conversely, if the Venturi effect (suction force) is too weak, it may take longer a relatively longer period of time to vent the exhaust collection bag 170.

FIGS. 9A and 9B show perspective views of the evacuation assembly 180 detached from the sink and also attached within the sink 190. The assembly 180 may be coupled to the inlet tubing 184 which may be a flexible length of tubing having an attachment or coupling 210 for coupling to the faucet 192 in a fluid tight seal. The length of inlet tubing 184 may be flexible to accommodate the relative positioning of the assembly 180 relative to the positioning of the faucet 192. The base 186 may incorporate a suctioning mechanism or sealing ring 212 which may also include an opening for the fluid outlet. The base 186 may also be sufficiently wide enough to be positioned directly over the drain 194 at the bottom of the sink basin 196 so that a fluid seal around the drain 194 may be formed to prevent the leakage or escape of the water and dissolved nitrous gas.

FIGS. 10A and 10B illustrate perspective views of another variation of an evacuation assembly 220 detached from the sink and also attached within the sink 190. In this variation, the evacuation assembly 220 may include an assembly housing 222 attached to a flexible inlet tubing 224 having an attachment or coupling 210 for coupling to the faucet 192 in a fluid tight seal. The suction chamber 236 may extend from the housing 222 for attachment to the evacuation line 140. The assembly housing 222 may further include a fluid outlet 234 for positioning directly into the drain 194. An attachment base 226 having one or more securement arms 228 may extend radially from the housing 222 and project distally with corresponding suction attachments 230. When the assembly 220 is positioned within the sink 190, the fluid outlet 234 may be positioned directly into the drain 194 and the attachment base 226 may slide down the housing 222, as indicated by the arrows, allowing for the suction attachments 230 to attach onto the floor of the sink basin 196 to maintain a position of the assembly housing 222 during evacuation.

Figure 11B:
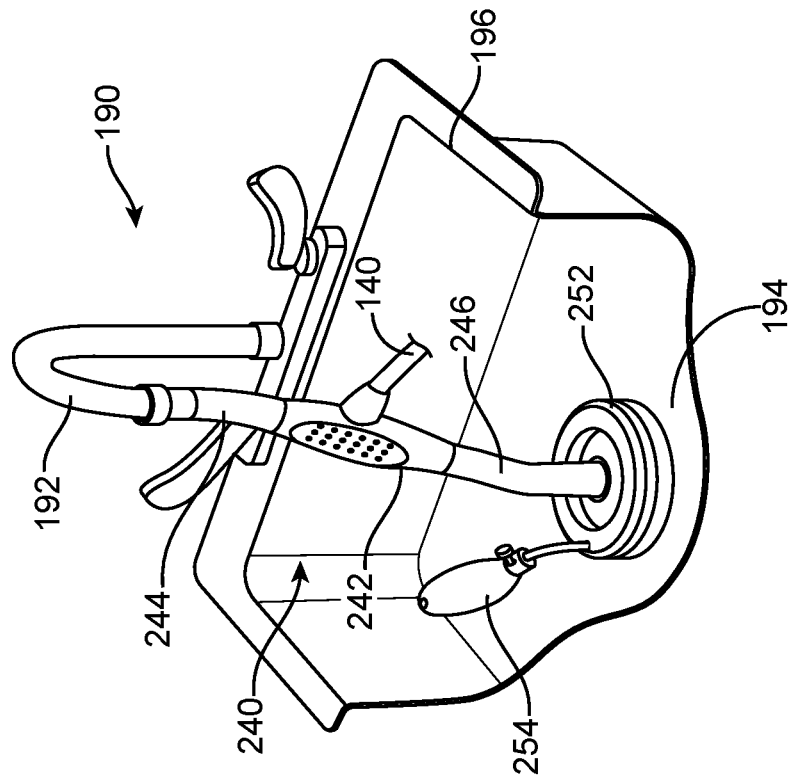
FIGS. 11A and 11B show perspective views of another variation of the evacuation assembly having an attachment base with a suction mechanism detached from the sink and also attached within the sink.
Figure 11A:
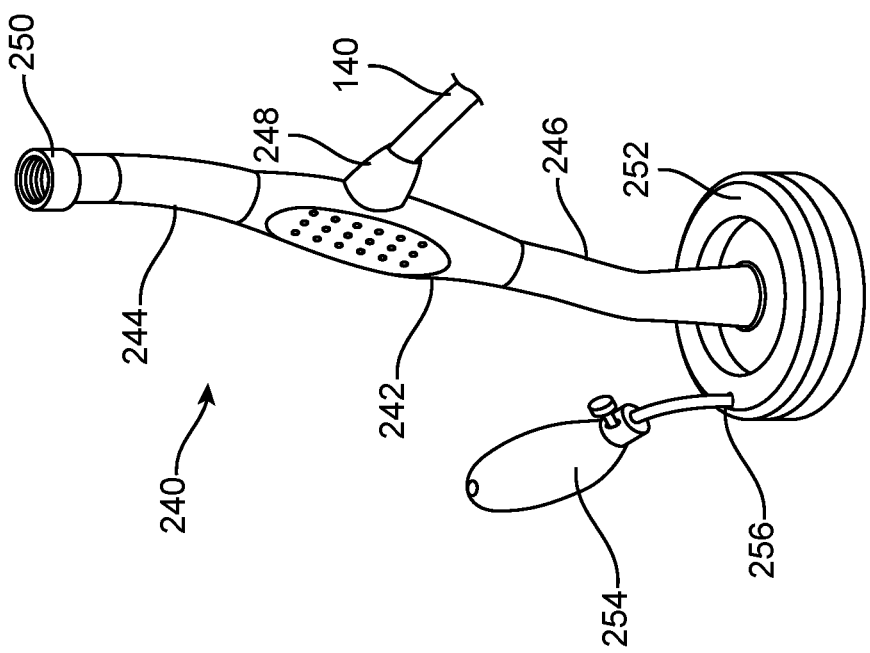

FIGS. 11A and 11B illustrate perspective views of yet another variation of an evacuation assembly 240 detached from the sink and also attached within the sink 190. In this variation, the evacuation assembly 240 may include an assembly housing 242 attached to a flexible inlet tubing 244 having an attachment or coupling 250 for coupling to the faucet 192 in a fluid tight seal. The suction chamber 248 may extend from the housing 242 for attachment to the evacuation line 140. The assembly housing 242 may further include a fluid outlet 246 which may attach to a base for positioning directly over the drain 194. The base 252 may be attached to a pump 254 fluidly coupled via opening 256 which may allow for the base 252 to be suctioned onto the sink basin 196 around the drain 194 to create a fluid tight connection. When the assembly 240 is positioned within the sink 190, the base 252 may be positioned directly over the drain 194 and the pump 254 may be actuated to secure the base 252 onto the floor of the sink basin 196 to maintain a position of the assembly housing 242 during evacuation.

FIG. 12A shows a perspective view of the evacuation assembly 240 but where the base 262 is configured to create a suction force using the low pressure generated by the flow assembly within the housing 242 rather than a separate pump. When the water is introduced through the assembly 240, a diverter switch 260 may be actuated upon the suction chamber 248 to close off the evacuation line 140 and instead couple to a second line in fluid communication with a suctioning chamber in base 262. Once the base 262 has been sufficiently adhered within the sink, the diverter switch 260 may be actuated again to generate the suction within the suction chamber 248. Alternatively, chamber 248 may be closed to allow for a second flow assembly within the base 262 to generate a suctioning force for adhering the base 262. A switch or actuator 264, as illustrated in the perspective detail view of FIG. 12B, may be used for this purpose.

In yet other variations, rather than incorporating a diverter switch or actuator, the flow may be diverted automatically into the base until a threshold suction force is reached for securing the base to the sink basin. Once the threshold level has been attained, a valve having a predetermined closing pressure or a separate controller monitoring the pressure may be used to automate the flow.

FIGS. 13A and 13B illustrate perspective views of yet another variation of an evacuation assembly 270 detached from the sink and also attached within the sink 190. In this variation, the evacuation assembly 270 may include an assembly housing 272 having an attachment or coupling 274 for directly coupling the housing 272 to the faucet 192 in a fluid tight seal. The suction chamber 280 may extend from the housing 272 for attachment to the evacuation line 140. The assembly housing 272 may further include a fluid outlet 276 which may attach to a base 278 having a suction cup around a sealing ring for positioning directly over the drain 194.

Figure 14B:
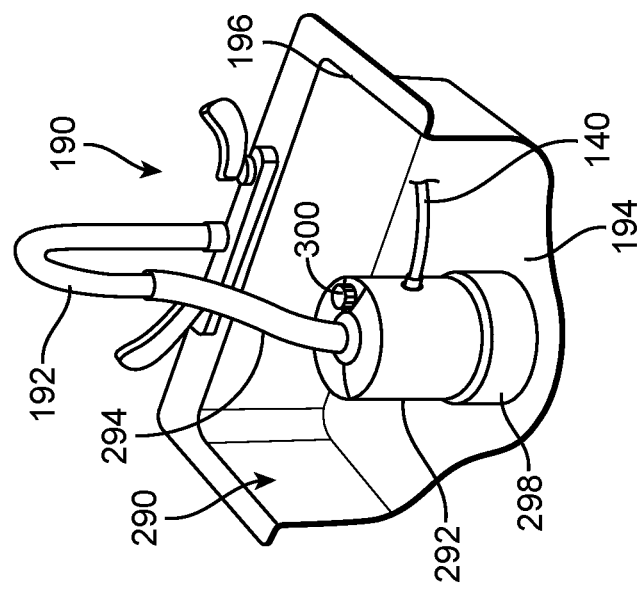
FIGS. 14A and 14B show perspective views of another variation of the evacuation assembly having a base which may contain a reservoir detached from the sink and also attached within the sink.
Figure 14A:
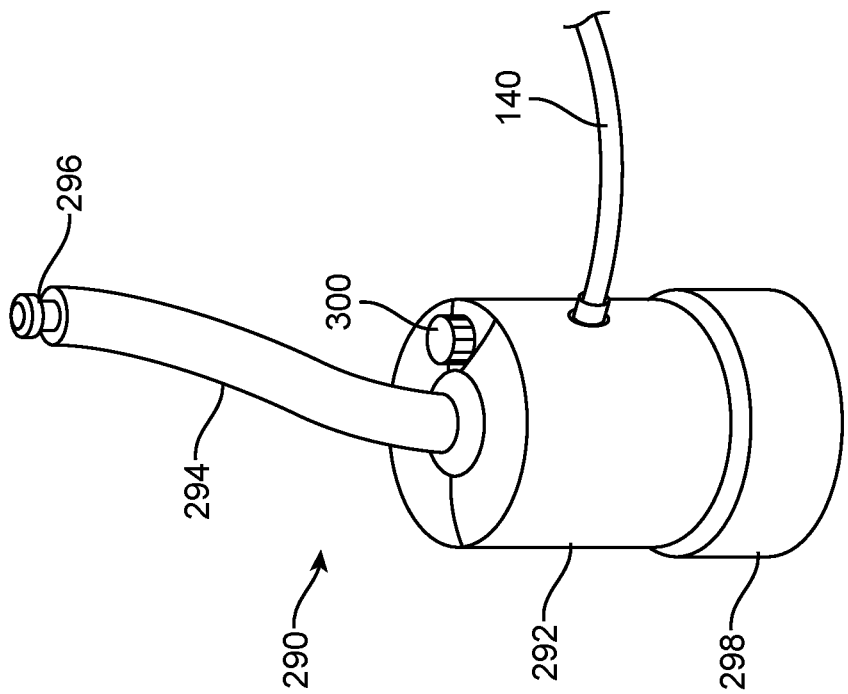

FIGS. 14A and 14B illustrate perspective views of yet another variation of an evacuation assembly 290 detached from the sink and also attached within the sink 190. In this variation, the evacuation assembly 290 may include an assembly housing 292 attached to a flexible inlet tubing 294 having an attachment or coupling 296 for coupling to the faucet 192 in a fluid tight seal. The suction chamber may be contained within housing 292 for attachment to the evacuation line 140. The housing 292 may be contain a reservoir 298, e.g., 2.5 L, within for receiving a volume of the water which may function as a weight which prevents the housing 292 from moving when positioned over the drain 194. A diverter switch 300 may be actuated to initially divert the flow of water into the reservoir 298 within the housing 292. Once sufficiently filled, the diverter switch 300 may be actuated to allow for the water flow to pass through the fluid assembly within the housing 292. The assembly housing 292 may further include a fluid outlet which may be positioned directly over the drain 194.

Figure 15B:
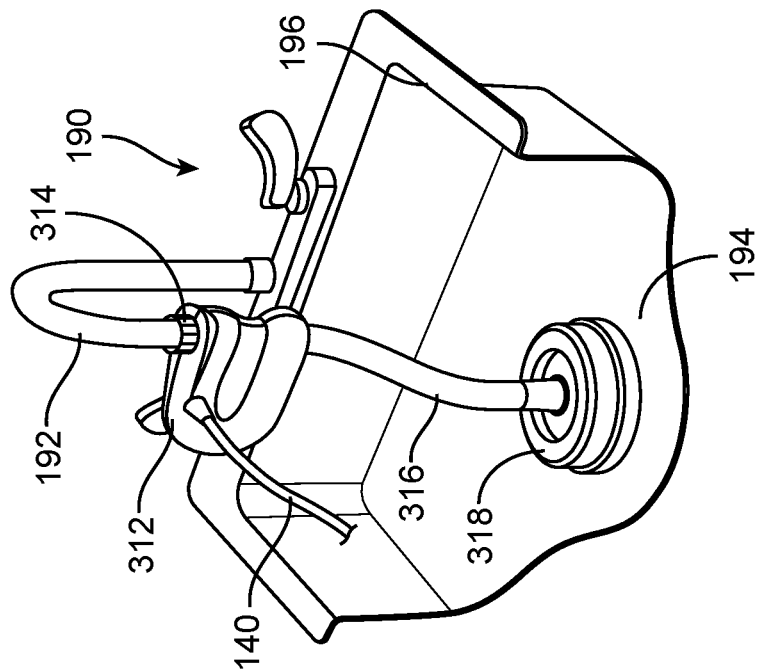
FIGS. 15A and 15B show perspective views of another variation of the evacuation assembly having a housing which can be coupled directly to the faucet detached from the sink and also attached within the sink.
Figure 15A:
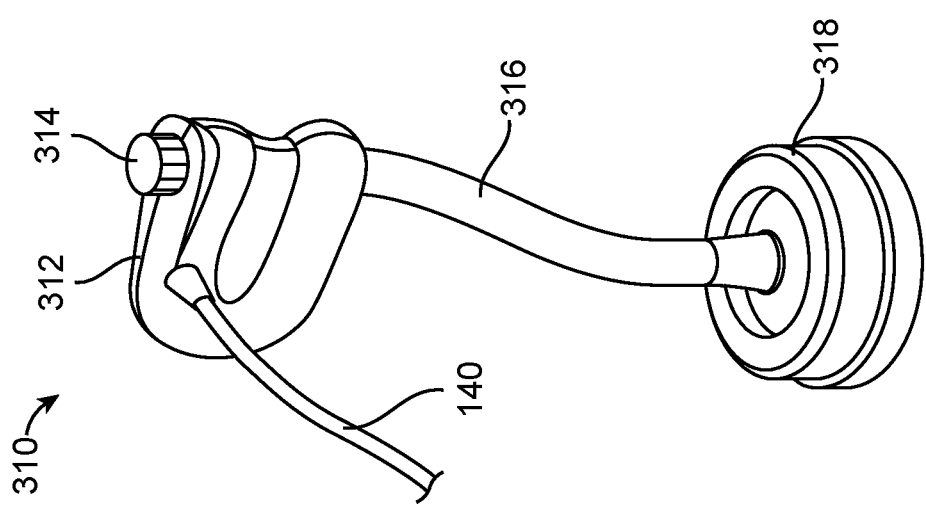

FIGS. 15A and 15B illustrate perspective views of yet another variation of an evacuation assembly 310 detached from the sink and also attached within the sink 190. In this variation, the evacuation assembly 310 may include an assembly housing 312 having an attachment or coupling 314 for coupling the housing 312 directly to the faucet 192 in a fluid tight seal. With the fluid assembly contained within the housing 312, a flexible outlet tubing 316 may be coupled to the housing 312 and extend towards a base 318 for positioning over the drain 194. The evacuation line 140 may be attached directly to a suction chamber contained within the housing 312.

Figure 16:
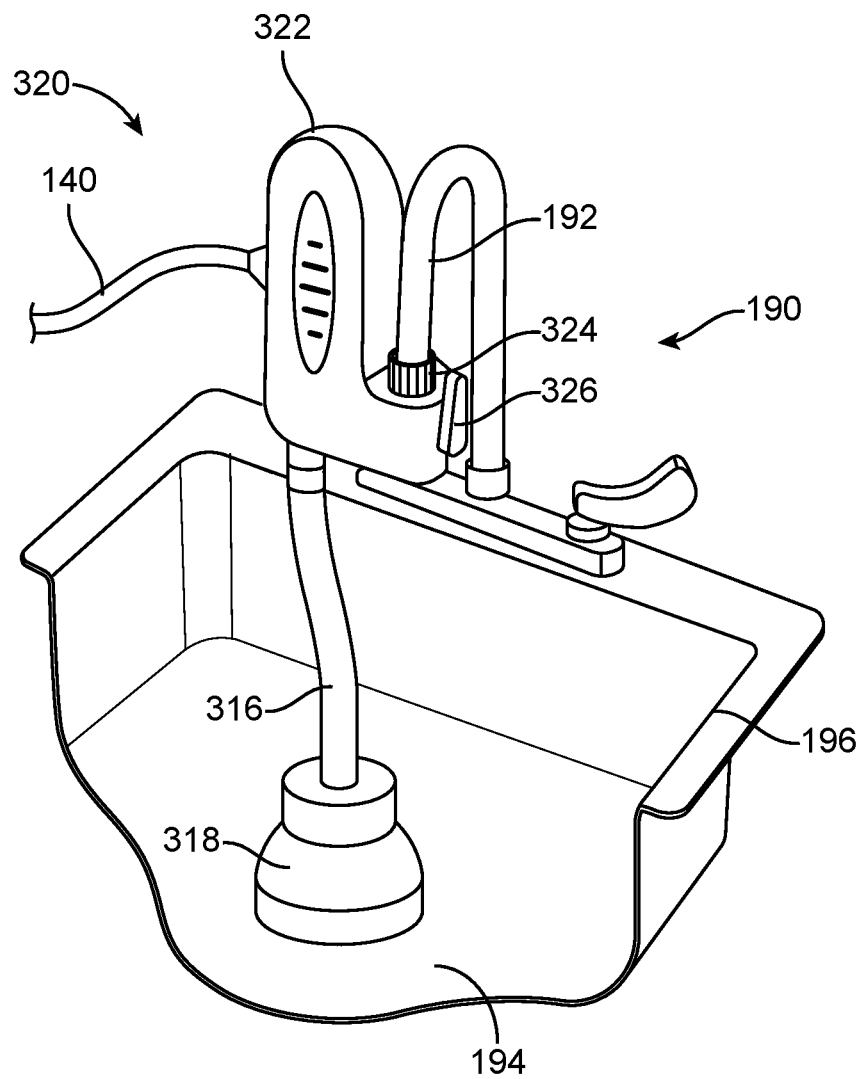
FIG. 16 shows a perspective view of another variation of the evacuation assembly having a housing which can also be coupled directly to the faucet.

FIG. 16 shows a perspective view of a similar embodiment where the evacuation assembly 320 may have a housing oriented to extend vertically with an attachment or coupling 324 which may be coupled to the faucet 192 to directly attach the housing 322 to the faucet 192. The evacuation line 140 may be attached directly to a suction chamber contained within the housing 322 and the housing 322 may further incorporate a diverter switch 326 which may be actuated engage or disengage the flow of water from the faucet 192.

Figure 17B:
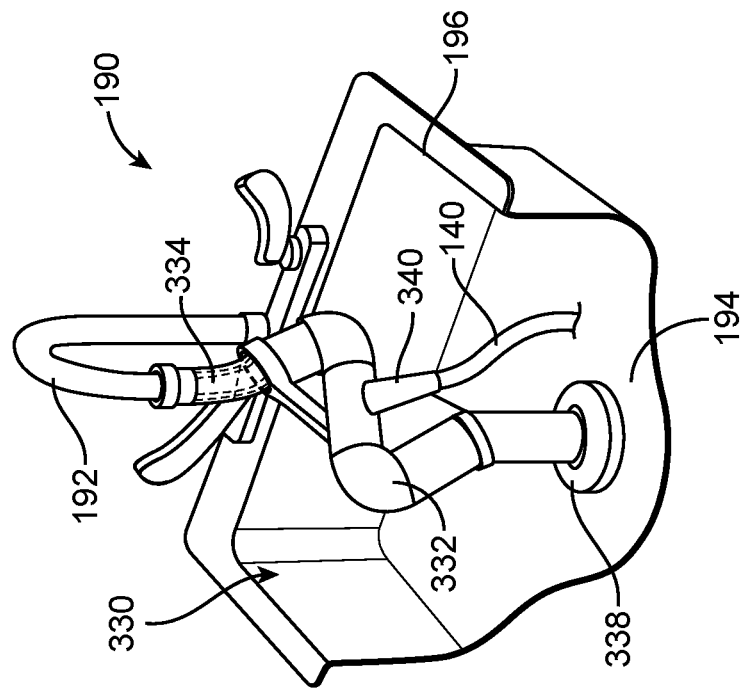
FIGS. 17A and 17B show perspective views of another variation of the evacuation assembly having a housing which is oriented horizontally relative to the sink basin detached from the sink and also attached within the sink.
Figure 17A:
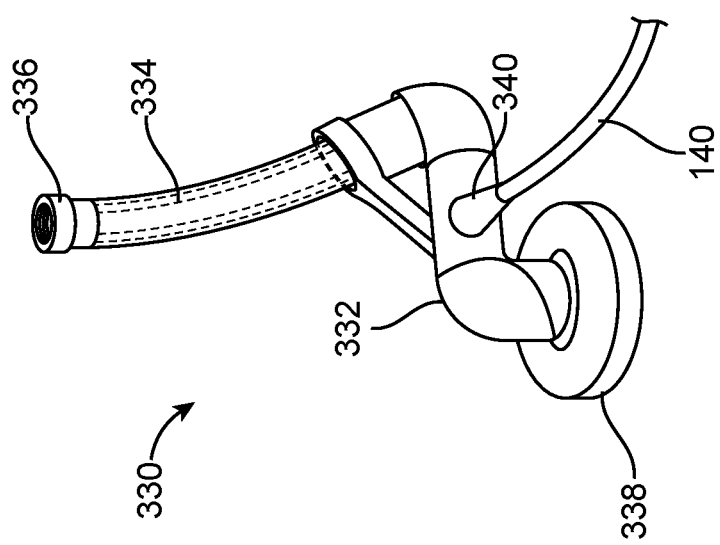

FIGS. 17A and 17B illustrate perspective views of yet another variation of an evacuation assembly 330 detached from the sink and also attached within the sink 190. In this variation, the evacuation assembly 330 may include an assembly housing 332 attached to a flexible inlet tubing 334 having an attachment or coupling 336 for coupling to the faucet 192 in a fluid tight seal. The suction chamber 340 may extend from the housing 332 for attachment to the evacuation line 140. The housing 332 may also be attached directly to a base 338 or may incorporate a tubing for coupling between the housing 332 and the base 338 which may be positioned directly over the drain 194. The housing 332 may also be oriented in this variation to extend horizontally relative to the sink basin 196 to facilitate the diffusion of the exhaust gas from exhaust line 140 for dissolving into the water flowing through the housing 332. Alternatively, the housing 332 may instead be angled relative to the sink basin 196.

Figure 18B:
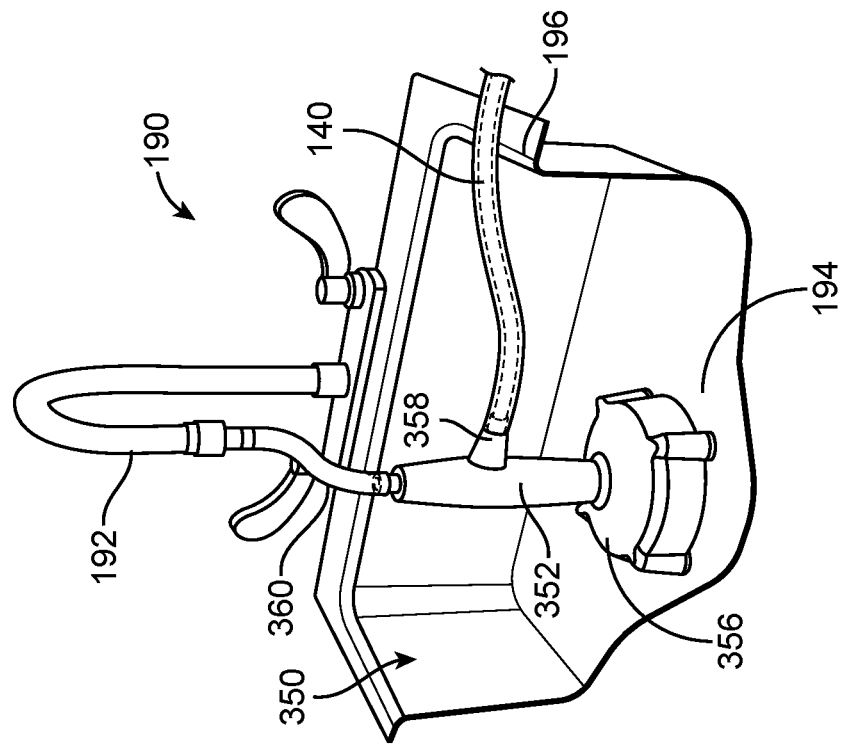
FIGS. 18A and 18B show perspective views of another variation of the evacuation assembly having a housing which is oriented vertically relative to the sink basin detached from the sink and also attached within the sink.
Figure 18A:
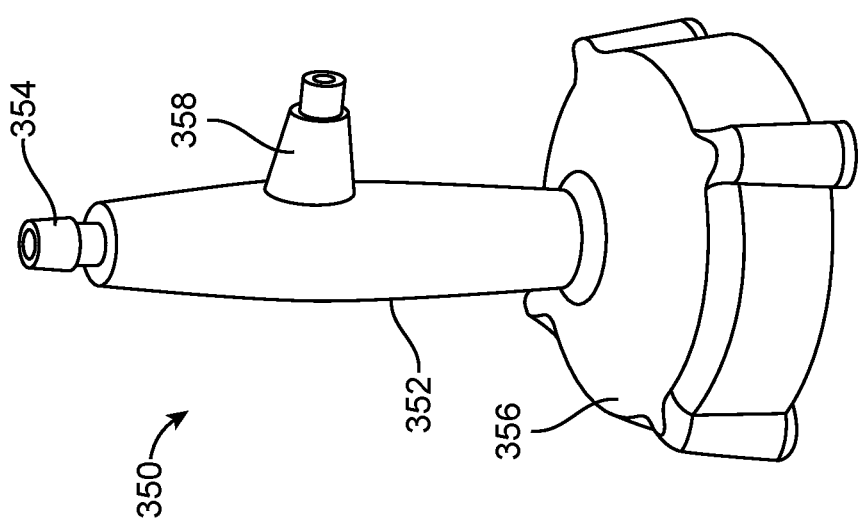

FIGS. 18A and 18B illustrate perspective views of yet another variation of an evacuation assembly 350 detached from the sink and also attached within the sink 190. In this variation, the evacuation assembly 350 may include an assembly housing 352 attached to a flexible inlet tubing 360 via an attachment or coupling 354. The suction chamber 358 may extend from the housing 352 for attachment to the evacuation line 140. The housing 352 may also be attached directly to a base 356 which may be positioned directly over the drain 194. The housing 352 may also be oriented in this variation to extend directly vertically relative to the sink basin 196.

While illustrative examples are described above, it will be apparent to one skilled in the art that various changes and modifications may be made therein. Moreover, various apparatus or procedures described above are also intended to be utilized in combination with one another, as practicable. The appended claims are intended to cover all such changes and modifications that fall within the true spirit and scope of the invention.

What is claimed is:

1. A cryogenic exhaust removal apparatus, comprising:
   a housing having an inlet for fluidly coupling to a source of water and an outlet for fluidly coupling to a drain; and
   a suction chamber in fluid communication with the housing, wherein the suction chamber is further configured to be detachably coupled to an exhaust collection reservoir having a volume of exhaust gas,
   wherein introduction of water through the inlet generates a pressure reduction within the suction chamber such that the volume of exhaust gas is drawn from the exhaust collection reservoir and into the housing for dissolving the exhaust gas into the water and draining the dissolved exhaust gas out through the drain.

2. The apparatus of claim 1 wherein a first cross-sectional area defined by the inlet is larger than a second cross-sectional area defined by the outlet.

3. The apparatus of claim 1 wherein the inlet comprises an inlet tubing having an attachment or coupling for fluidly coupling to a faucet.

4. The apparatus of claim 1 wherein the outlet comprises an outlet tubing.

5. The apparatus of claim 1 further comprising a base through which the outlet passes and which fluidly couples to the drain within a sink.

6. The apparatus of claim 5 wherein the base is slidably movable along the housing.

7. The apparatus of claim 5 wherein the base comprises one or more suction members for attachment around the drain.

8. The apparatus of claim 5 wherein the base comprises a reservoir for receiving a volume of water.

9. The apparatus of claim 5 wherein the base is in fluid communication with the suction chamber such that the base is actuatable to adhere to the drain via a suction force.

10. A method of evacuating cryogenic exhaust, comprising:
    receiving a flow of water through an inlet of a housing;
    passing the flow of water through the housing such that a pressure within a suction chamber is reduced;
    drawing a volume of cryogenic exhaust into the suction chamber via the reduced pressure such that the cryogenic exhaust dissolves into the flow of water; and
    passing the flow of water and dissolved cryogenic exhaust into a drain.

11. The method of claim 10 wherein receiving the flow of water comprises receiving the water from a faucet fluidly coupled to the inlet.

12. The method of claim 10 wherein passing the flow of water through the housing comprises restricting the flow such that the pressure reduces.

13. The method of claim 10 wherein drawing the volume of cryogenic exhaust comprises drawing the volume from an exhaust collection bag fluidly coupled to the suction chamber.

14. The method of claim 10 wherein drawing the volume of cryogenic exhaust comprises drawing the volume from a cryogenic ablation device fluidly coupled to the suction chamber.

15. The method of claim 10 wherein passing the flow of water and dissolved cryogenic exhaust comprises sealing a base of the housing around the drain.

16. The method of claim 15 wherein sealing the base comprises drawing a vacuum within the base such that the base is attached to a surface in proximity to the drain.

17. A cryogenic exhaust removal system, comprising:
a housing having an inlet for fluidly coupling to a source of water and an outlet for fluidly coupling to a drain;
a suction chamber in fluid communication with the housing, wherein the suction chamber is further configured to be detachably coupled to an exhaust collection reservoir having a volume of exhaust gas, wherein introduction of water through the inlet generates a pressure reduction within the suction chamber such that the volume of exhaust gas is drawn from the exhaust collection reservoir and into the housing for dissolving the exhaust gas into the water and draining the dissolved exhaust gas out through the drain; and
an exhaust collection apparatus containing the volume of exhaust gas for fluidly coupling to the suction chamber via an exhaust line.

18. The system of claim 17 wherein the exhaust collection apparatus comprises:
a first layer and a second layer attached along a periphery and forming an enclosed volume, wherein the periphery defines radiused corners and an extension member;
a tubing connector positioned along the first layer and extending through the first layer in fluid communication with the enclosed volume, wherein the tubing connector is in proximity to a bottom edge of the first layer and is configured for coupling to the exhaust line; and
a drain closure positioned along the first layer and extending through the first layer in fluid communication with the enclosed volume, wherein the drain closure is located in proximity to the bottom edge.

19. The system of claim 17 further comprising a tissue treatment system configured to be fluidly coupled to the exhaust collection apparatus, the tissue treatment system comprising:
an elongate probe having a distal tip and a flexible length;
at least one infusion lumen positioned through or along the elongate probe, wherein the infusion lumen defines one or more openings along its length;
at least one delivery lumen slidingly positioned through or along the infusion lumen, wherein translation of the delivery lumen relative to the infusion lumen controls a number of unobstructed openings along the infusion lumen such that proximal retraction of the delivery lumen relative to the infusion lumen from a first location increases the number of unobstructed openings, and distal translation of the delivery lumen relative to the infusion lumen from the first location decreases the number of unobstructed openings; and
a liner expandably enclosing the probe such that a cryoablative fluid introduced through the unobstructed openings is sprayed into contact with an interior surface of the liner and coats the interior surface.

20. The system of claim 17 wherein the inlet of the exhaust removal system is configured to be fluidly coupled to a faucet.

* * * * *